(12) United States Patent
Alon-Braitbart et al.

(10) Patent No.: US 11,520,288 B2
(45) Date of Patent: Dec. 6, 2022

(54) PRODUCING A COMPUTER GENERATED HOLOGRAPHIC IMAGE

(71) Applicant: Real View Imaging Ltd., Yokneam (IL)

(72) Inventors: Shlomo Alon-Braitbart, Haifa (IL); Carmel Rotschild, Ganei-Tikva (IL); Shaul Alexander Gelman, Raanana (IL)

(73) Assignee: Real View Imaging Ltd., Yokneam (IL)

( * ) Notice: Subject to any disclaimer, the term of this patent is extended or adjusted under 35 U.S.C. 154(b) by 151 days.

(21) Appl. No.: 16/798,464

(22) Filed: Feb. 24, 2020

(65) Prior Publication Data
US 2020/0192288 A1    Jun. 18, 2020

Related U.S. Application Data

(63) Continuation of application No. 15/158,838, filed on May 19, 2016, now Pat. No. 10,571,862.

(60) Provisional application No. 62/164,687, filed on May 21, 2015.

(51) Int. Cl.
*G03H 1/08*    (2006.01)
*G06T 15/00*   (2011.01)
*G06T 15/20*   (2011.01)

(52) U.S. Cl.
CPC .............. *G03H 1/0891* (2013.01); *G03H 1/08* (2013.01); *G06T 15/00* (2013.01); *G06T 15/20* (2013.01); *G03H 2001/0816* (2013.01); *G03H 2210/30* (2013.01)

(58) Field of Classification Search
CPC .... G03H 1/0891; G03H 1/08; G03H 2210/30; G03H 2001/0816; G03H 2210/33; G03H 2210/454; G03H 1/2294; G03H 1/0808
USPC ........................................................ 359/9, 29
See application file for complete search history.

(56) References Cited

U.S. PATENT DOCUMENTS

| 5,852,504 | A    | 12/1998  | Kato et al. | |
|-----------|------|----------|-------------|---|
| 7,636,184 | B2 * | 12/2009  | Schwerdtner | G03H 1/2294 359/9 |
| 2008/0259419 | A1 * | 10/2008 | Wilson | G03H 1/0808 359/9 |

(Continued)

OTHER PUBLICATIONS

Applicant—Initiated Interview Summary dated Nov. 1, 2018 From the US Patent and Trademark Office Re. U.S. Appl. No. 15/158,838. (3 pages).

(Continued)

*Primary Examiner* — Audrey Y Chang

(57) ABSTRACT

A method of producing a Computer Generated Hologram (CGH) for producing a 3 dimensional (3D) holographic image, including receiving data describing a 3D scene, producing a first CGH for producing a 2D image of the 3D scene as viewed from a specific viewing direction, the 2D image perpendicular to the viewing direction, decomposing the 2D image to a plurality of slices at different depths along the viewing direction, adjusting the first CGH by making, for at least one of the plurality of slices, a correction to the CGH associated with a depth of the slice along the viewing direction, thereby producing a corrected CGH for producing a 3D holographic image of the 3D scene. Related apparatus and methods are also described.

14 Claims, 13 Drawing Sheets

(56) References Cited

U.S. PATENT DOCUMENTS

2010/0157399 A1\* 6/2010 Kroll .................... G03H 1/2205
359/11
2013/0265622 A1 10/2013 Christmas et al.
2014/0211286 A1\* 7/2014 Nam .................... G03H 1/0808
359/9
2015/0286187 A1\* 10/2015 Collings ................. G02B 5/32
359/9

OTHER PUBLICATIONS

Official Action dated Aug. 9, 2019 From the US Patent and Trademark Office Re. U.S. Appl. No. 15/158,838. (7 Pages).
Official Action dated Jun. 15, 2018 From the US Patent and Trademark Office Re. U.S. Appl. No. 15/158,838. (14 pages).
Official Action dated Jan. 23, 2019 From the US Patent and Trademark Office Re. U.S. Appl. No. 15/158,838. (7 pages).
Official Action dated Oct. 31, 2017 From the US Patent and Trademark Office Re. U.S. Appl. No. 15/158,838. (14 pages).
Restriction Official Action dated Aug. 10, 2017 From the US Patent and Trademark Office Re. U.S. Appl. No. 15/158,838. (6 pages).
Dominguez-Caballero et al. "Design and Fabrication of Computer Generated Holograms for Fresnel Domain Lithography", Digital Holography and Three-Dimensional Imaging, p. 1-3, Apr. 26, 2009.
Fienup "Phase Retrieval Algorithms: A Comparison", Applied Optics, 21(15): 2758-2769, Aug. 1, 1982.
Fienup "Reconstruction of an Object From the Modulus of Its Fourier Transform", Optics Letters, 3(1): 27-29, Jul. 1978.
Gerchberg et al. "A Practical Algorithm for the Determination of Phase From Image and Diffraction Plane Pictures", Optik, 35(2): 237-246, 1972.
Goodman "Holography", Introduction to Fourier Optics, 3rd Ed., Chap.9: 297-399, Dec. 10, 2004.

\* cited by examiner 801    802

PRODUCING A COMPUTER GENERATED HOLOGRAPHIC IMAGE

RELATED APPLICATIONS

This Application is a continuation of U.S. patent application Ser. No. 15/158,838, filed on May 19, 2016, which claims the benefit of priority under 35 USC 119(e) of U.S. Provisional Patent Application No. 62/164,687 filed on May 21, 2015, the contents of which are incorporated herein by reference in their entirety.

FIELD AND BACKGROUND OF THE INVENTION

The present invention, in some embodiments thereof, relates to producing a computer generated holographic image of a 3D object, and, more particularly, but not exclusively, to a holographic image of a 3D object produced by modulating light by a Spatial Light Modulator (SLM).

Additional background art includes:

R. W. Gerchberg and W. O. Saxton, "A practical algorithm for the determination of the phase from image and diffraction plane pictures," Optik (Stuttgart) 35, 237-246 (1972).

JoséA. Domínguez-Caballero, Satoshi Takahashi, Sung Jin (James) Lee, and George Barbastathis, "Design and Fabrication of Computer Generated Holograms for Fresnel Domain Lithography" Optical Society of America, 2009.

Introduction to Fourier optics", J. W. Goodman, Fourier Optics $3^{rd}$ Edition, pages 297-399.

J. R. Fienup, "Reconstruction of an object from the modulus of its Fourier transform" Opt. Lett. 3, 27-29 (1978).

J. R. Fienup, "Phase retrieval algorithm: a comparison," Appl. Opt. 21, 2758-2769 (1982).

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to producing a computer generated holographic image of a 3D object, and, more particularly, but not exclusively, to a holographic image of a 3D object produced by modulating coherent light by a Spatial Light Modulator (SLM).

According to an aspect of some embodiments of the present invention there is provided a method of producing a 3 dimensional (3D) holographic image, the method including producing a Computer Generated Hologram (CGH) for inputting values to a Spatial Light Modulator (SLM), and shining coherent light onto the SLM, wherein the producing a CGH includes receiving data describing a 3D scene, producing a first CGH for producing a 2D image of the 3D scene as viewed from a specific viewing direction, the 2D image approximately perpendicular to the viewing direction, decomposing the 2D image to a plurality of slices at different depths along the viewing direction, adjusting the first CGH by making, for each one of the plurality of slices, a correction to the CGH associated with a depth of each of the plurality of slices along the viewing direction, thereby producing a corrected CGH for producing a 3D holographic image of the 3D scene.

The term "3D scene" in all its grammatical forms is used throughout the present specification and claims interchangeably with the term "3D object" and its corresponding grammatical forms.

According to some embodiments of the invention, the producing a first CGH for producing a 2D image of the 3D scene includes producing a plurality of CGHs, each one of the CGHs for a slice of the 3D scene.

According to an aspect of some embodiments of the present invention there is provided a method of producing a 3 dimensional (3D) holographic image, the method including producing a Computer Generated Hologram (CGH) for inputting values to a Spatial Light Modulator (SLM), and shining coherent light onto the SLM, wherein:

the producing a CGH includes receiving data describing a 3D scene, using an iterative method for producing a first complex amplitude for producing a plane 2D image of the 3D scene as viewed from a specific viewing direction, the plane of the plane 2D image perpendicular to the viewing direction, decomposing the plane 2D complex amplitude to a plurality of slices at different depths along the viewing direction, adjusting the first complex amplitude by making, for each one of the plurality of slices, a correction to the complex amplitude associated with a depth of each of the plurality of slices along the viewing direction, thereby producing a corrected complex amplitude for producing a 3D holographic image of the 3D scene.

According to some embodiments of the invention, the making a correction for depths of each one of the slices along the viewing direction includes adding a quadratic phase correction to the first complex amplitude.

According to some embodiments of the invention the 3D scene is pre-corrected for a distortion associated with the quadratic phase correction.

According to some embodiments of the invention, the making a correction for depths of each one of the slices along the viewing direction includes adding a Fresnel correction to the first complex amplitude.

According to some embodiments of the invention the 3D scene is pre-corrected for a distortion associated with the Fresnel correction.

According to some embodiments of the invention, the making a correction for depths of each one of the slices along the viewing direction includes adding an angular spectrum correction to the first complex amplitude.

According to some embodiments of the invention the 3D scene is pre-corrected for a distortion associated with the angular spectrum correction.

According to some embodiments of the invention, the quadratic phase correction is calculated based, at least in part, on the depth of each one of the plurality of slices, divided by a wavelength of the coherent light, modulo $2\pi$.

According to some embodiments of the invention, a thickness of each one of the plurality of the slices is based, at least in part, on a depth resolution of the human eye.

According to some embodiments of the invention, a thickness of each one of the plurality of the slices is based, at least in part, on a number of slices which reduces a computational load.

According to some embodiments of the invention, a thickness of each one of the plurality of the slices is based, at least in part, on a cross-sectional area of the slice perpendicular to the viewing direction.

According to some embodiments of the invention, the number of slices is 2, 3, 4, 5, 6, 7, 8, 9, 10, 15, 16, 20, 25, 30, 32, 50, 64, 128, 512, 1024, and even greater. The number of slices determines depth resolution.

According to some embodiments of the invention, the number of slices is in a range of 5-10.

According to some embodiments of the invention, the number of slices is based, at least in part, on a ratio between a depth of the 3D scene and a distance from which an observer is intended to view the 3D holographic image of the 3D scene.

According to some embodiments of the invention, a thickness of each one of the plurality of the slices is equal.

It is noted that a thickness of the slice corresponds to a resolution, in the Z direction, also termed a depth resolution, of a CGH image produced from a CGH computed as described herein.

According to some embodiments of the invention, a thickness of at least two of the plurality of the slices is different.

According to some embodiments of the invention, the corrected complex amplitude has a z-dependent quadratic phase front.

According to some embodiments of the invention, the corrected complex amplitude has a z-dependent angular spectrum propagation contribution.

According to some embodiments of the invention, the corrected complex amplitude has a Z-dependent Fresnel propagation contribution.

According to some embodiments of the invention the 3D scene is pre-corrected for a distortion associated with a Z dependent quadratic phase front or the Fresnel propagation contribution or the angular spectrum propagation contribution.

According to an aspect of some embodiments of the present invention there is provided a system for producing a Computer Generated Hologram (CGH), the system including a CGH computing unit, and a Spatial Light Modulator (SLM), wherein the CGH computing unit is arranged to receive data describing a 3 dimensional (3D) scene and produce a CGH for producing a 3D holographic image of the 3D scene, the CGH computing unit is arranged for transmitting values to as input for pixels of the SLM, and the producing a CGH includes receiving data describing the 3D scene, producing a first CGH for producing a plane 2D image of the 3D scene as viewed from a specific viewing direction, the plane of the plane 2D image perpendicular to the viewing direction, decomposing the plane 2D image to a plurality of slices at different depths along the viewing direction, adjusting the first CGH by making, for each one of the plurality of slices, a correction to the CGH associated with a depth of each of the plurality of slices along the viewing direction, thereby producing a corrected CGH for producing a 3D holographic image of the 3D scene.

According to an aspect of some embodiments of the present invention there is provided a system for producing a Computer Generated Hologram (CGH), the system including a CGH computing unit, and a Spatial Light Modulator (SLM), wherein the CGH computing unit is arranged to receive data describing a 3 dimensional (3D) scene and produce a CGH for producing a 3D holographic image of the 3D scene, the CGH computing unit is arranged for transmitting values to as input for pixels of the SLM, and the producing a CGH includes receiving data describing the 3D scene, producing a first optimized complex amplitude for producing a plane 2D image of the 3D scene as viewed from a specific viewing direction, the plane of the plane 2D image perpendicular to the viewing direction, decomposing the plane 2D image to a plurality of slices at different depths along the viewing direction, adjusting the first optimized complex amplitude by making, for each one of the plurality of slices, a correction to the CGH associated with a depth of each of the plurality of slices along the viewing direction, thereby producing a corrected optimized complex amplitude for producing a 3D holographic image of the 3D scene.

According to an aspect of some embodiments of the present invention there is provided a method of transmitting a 3 dimensional (3D) holographic image, the method including receiving data describing a 3D scene, producing a first CGH for producing a plane 2D image of the 3D scene as viewed from a specific viewing direction, the plane of the plane 2D image perpendicular to the viewing direction, transmitting the first CGH and data for decomposing the plane 2D image to a plurality of slices at different depths along the viewing direction, receiving the first CGH and data for decomposing the plane 2D image to a plurality of slices at different depths along the viewing direction, decomposing the plane 2D image to a plurality of slices at different depths along the viewing direction, adjusting the first CGH by making, for each one of the plurality of slices, a correction to the CGH associated with a depth of each of the plurality of slices along the viewing direction, thereby producing a corrected CGH for producing a 3D holographic image of the 3D scene.

According to an aspect of some embodiments of the present invention there is provided a method of producing a Computer Generated Hologram (CGH) for producing a 3 dimensional (3D) holographic image, including receiving data describing a 3D scene, producing a first CGH for producing a 2D image of the 3D scene as viewed from a specific viewing direction, the 2D image perpendicular to the viewing direction, decomposing the 2D image to a plurality of slices at different depths along the viewing direction, adjusting the first CGH by making, for at least one of the plurality of slices, a correction to the CGH associated with a depth of the slice along the viewing direction, thereby producing a corrected CGH for producing a 3D holographic image of the 3D scene.

According to some embodiments of the invention, the producing the first CGH for producing the 2D image of the 3D scene includes producing a plurality of CGHs, each one of the CGHs for a slice of the 3D scene.

According to an aspect of some embodiments of the present invention there is provided a method of producing a Computer Generated Hologram (CGH) for producing a 3 dimensional (3D) holographic image, including receiving data describing a 3D scene, using an iterative method for producing a first 2D complex amplitude array for producing a hologram for producing a 2D image of the 3D scene as viewed from a specific viewing direction the 2D image perpendicular to the viewing direction, decomposing the 2D complex amplitude array to a plurality of slices at different depths along the viewing direction, adjusting the first complex amplitude array by making, for at least one of the plurality of slices, a correction to the complex amplitude associated with a depth of the slice along the viewing direction, thereby producing a corrected complex amplitude array for producing a 3D hologram for producing a 3 dimensional (3D) holographic image of the 3D scene.

According to some embodiments of the invention, the making a correction for depth of the slice along the viewing direction includes adding a quadratic phase correction to the first complex amplitude array.

According to some embodiments of the invention, the making a correction for depth of the slice along the viewing direction includes adding a correction to the first complex amplitude array selected from a group consisting of a parabolic phase correction, a Fresnel Z-correction, and an angular spectrum correction.

According to some embodiments of the invention, the quadratic phase correction is calculated based, at least in part, on the depth of the slice, divided by a wavelength of coherent light to be used for producing the 3D holographic image of the 3D scene, modulo $2\pi$.

According to some embodiments of the invention, a thickness of each one of the plurality of the slices is based, at least in part, on a consideration selected from a group consisting of a depth resolution of the human eye, a number of slices which reduces a computational load, a cross-sectional area of the slice perpendicular to the viewing direction, a number of pixels in a slice, and a density of points in a slice.

According to some embodiments of the invention, the number of slices is in a range of 5-10.

According to some embodiments of the invention, the number of slices is based, at least in part, on a ratio between a depth of the 3D scene and a distance from which an observer is intended to view the 3D holographic image of the 3D scene.

According to some embodiments of the invention, a thickness of each one of the plurality of the slices is equal.

According to some embodiments of the invention, a thickness of at least two of the plurality of the slices is different.

According to some embodiments of the invention, the corrected complex amplitude array has a z-dependent quadratic phase front.

According to some embodiments of the invention, the corrected complex amplitude array has a z-dependent contribution selected from a group consisting of
an angular spectrum propagation contribution, and a Fresnel propagation contribution.

According to an aspect of some embodiments of the present invention there is provided a system for producing a Computer Generated Hologram (CGH), the system including a CGH computing unit, and a Spatial Light Modulator (SLM), wherein the CGH computing unit is arranged to receive data describing a 3 dimensional (3D) scene and produce a CGH for producing a 3D holographic image of the 3D scene, the CGH computing unit is arranged for transmitting values to as input for pixels of the SLM, and the producing a CGH includes receiving data describing the 3D scene, producing a first CGH for producing a 2D image of the 3D scene as viewed from a specific viewing direction, the 2D image perpendicular to the viewing direction, decomposing the 2D image to a plurality of slices at different depths along the viewing direction, adjusting the first CGH by making, for each one of the plurality of slices, a correction to the CGH associated with a depth of each of the plurality of slices along the viewing direction, thereby producing a corrected CGH for producing a 3D holographic image of the 3D scene.

According to an aspect of some embodiments of the present invention there is provided a system for producing a Computer Generated Hologram (CGH), the system including a CGH computing unit, and a Spatial Light Modulator (SLM), wherein the CGH computing unit is arranged to receive data describing a 3 dimensional (3D) scene and produce a CGH for producing a 3D holographic image of the 3D scene, the CGH computing unit is arranged for transmitting values to the SLM as input for pixel values of the SLM, and the producing a CGH includes receiving data describing the 3D scene, producing a first optimized complex amplitude array for producing a 2D image of the 3D scene as viewed from a specific viewing direction, the 2D image perpendicular to the viewing direction, decomposing the 2D image to a plurality of slices at different depths along the viewing direction, adjusting the first optimized complex amplitude array by making, for each one of the plurality of slices, a correction to the CGH associated with a depth of each of the plurality of slices along the viewing direction, thereby producing a corrected optimized complex amplitude array for producing a 3D holographic image of the 3D scene.

According to some embodiments of the invention, the CGH computing unit includes a first computing unit adapted for the receiving and the producing, and further adapted to calculate a Z-map describing depths of points of the 2D scene relative to a specific Z direction, and transmit the 2D image and the Z-map to a second computing unit, and a second computing unit adapted for the decomposing and the adjusting.

According to an aspect of some embodiments of the present invention there is provided a method of transmitting a 3 dimensional (3D) holographic image, the method including receiving data describing a 3D scene, producing a first CGH for producing a 2D image of the 3D scene as viewed from a specific viewing direction, the 2D image perpendicular to the viewing direction, transmitting the first CGH and data for decomposing the 2D image to a plurality of slices at different depths along the viewing direction, receiving the first CGH and data for decomposing the 2D image to a plurality of slices at different depths along the viewing direction, decomposing the 2D image to a plurality of slices at different depths along the viewing direction, and adjusting the first CGH by making, for each one of the plurality of slices, a correction to the CGH associated with a depth of each of the plurality of slices along the viewing direction, thereby producing a second, corrected, CGH for producing a 3D holographic image of the 3D scene.

According to some embodiments of the invention, the data for decomposing the 2D image includes a Z-map describing depths of points of the 3D scene relative to the viewing direction.

According to an aspect of some embodiments of the present invention there is provided a data structure for producing a 3 dimensional (3D) holographic image of a 3D scene, the data structure including a first Computer Generated Hologram (CGH) for producing a 2D image of the 3D scene as viewed from a specific viewing direction, the 2D image perpendicular to the viewing direction, and a Z-map describing depths of points of the 3D scene relative to the viewing direction.

According to an aspect of some embodiments of the present invention there is provided a method of transmitting data for producing a 3 dimensional (3D) holographic image of a 3D scene, the method including transmitting a first Computer Generated Hologram (CGH) for producing a 2D image of the 3D scene as viewed from a specific viewing direction, the 2D image perpendicular to the viewing direction, and transmitting a Z-map describing depths of points of the 3D scene relative to the viewing direction.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
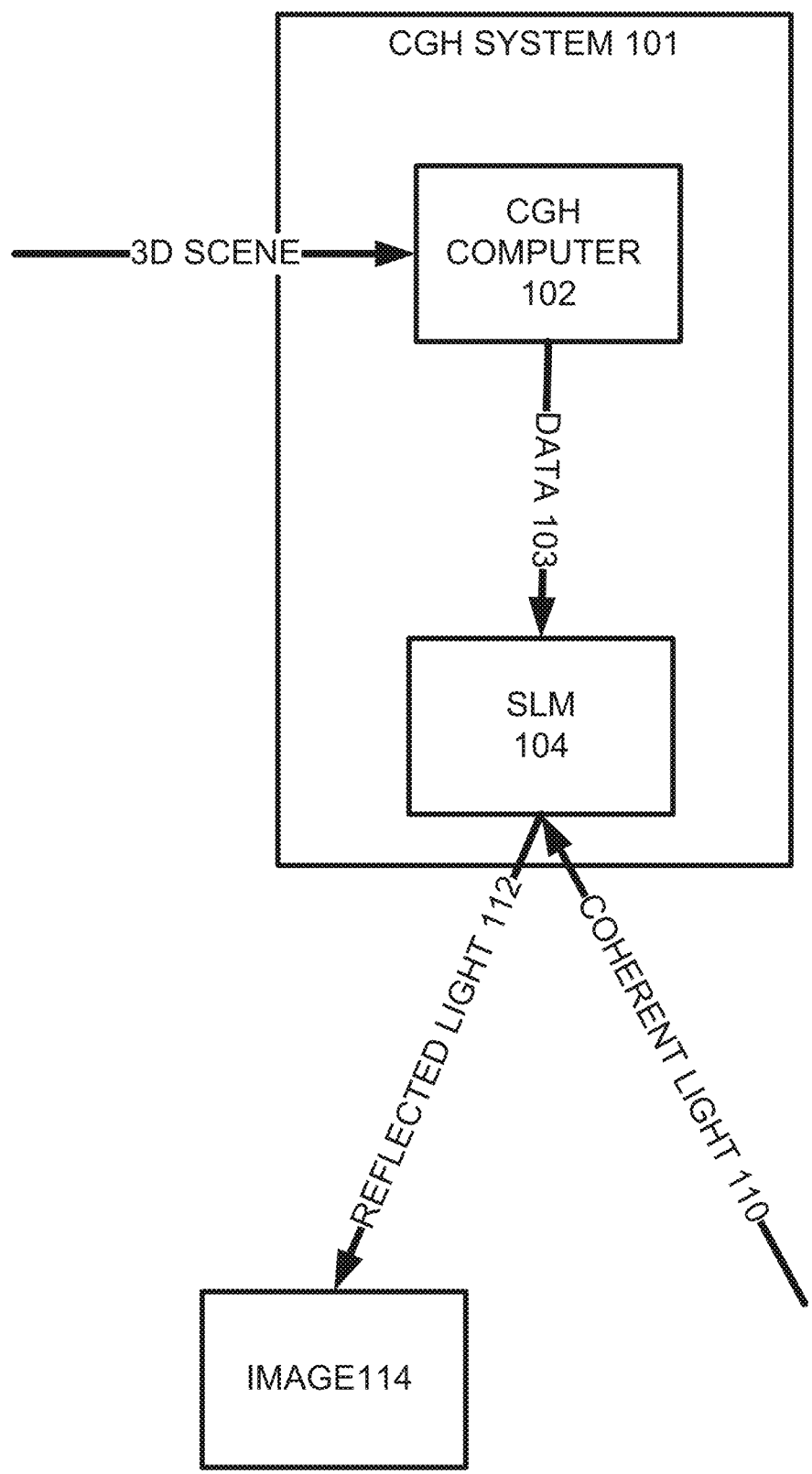
FIG. 1A is a simplified block diagram illustration of a system for producing a Computer Generated Hologram (CGH) according to an example embodiment of the invention.

The present invention, in some embodiments thereof, relates to producing a computer generated holographic image of a 3D object, and, more particularly, but not exclusively, to a holographic image of a 3D object produced by modulating coherent light by a Spatial Light Modulator (SLM).

The term CGH is used herein to mean Computer Generated Hologram, which corresponds to values of amplitude and/or phase of a SLM.

The term holographic image is used herein to mean a computer generated holographic image, which corresponds to an image produced when coherent light shines upon a SLM.

The term "matrix" in all its grammatical forms is used throughout the present specification and claims interchangeably with the term "array" and its corresponding grammatical forms.

An aspect of some embodiments of the invention includes efficiently computing values for a SLM for producing the holographic image. An aspect of some embodiments of the invention includes efficiently computing values for a phase-only SLM for producing the holographic image. An aspect of some embodiments of the invention includes efficiently computing values for an amplitude-only SLM for producing the holographic image.

In some embodiments, producing the 3D image includes computing values for SLM pixels as if the 3D object image is flattened to a planar image in an X-Y which is approximately perpendicular to a direction Z to the viewer, potentially saving computing time and effort which would be used for taking into account values of points on the 3D object in the Z direction.

In some embodiments, producing the 3D image includes computing values for SLM pixels as if the 3D object image is reduced to an equidistant from a specific point, producing a two-dimension image on a spherical shell which is perpendicular to a direction Z to the specific point, potentially saving computing time and effort which would be used for taking into account values of points on the 3D object in the Z direction.

Typically, computing values for the SLM pixels is performed iteratively.

In some embodiments, the values computed for the SLM pixels are complex numbers.

In some embodiments, the values computed for the SLM pixels are phase values of the complex numbers.

In some embodiments, after computing values for SLM pixels as if the 3D object image is flattened, an additional relative correction to the values is performed for the points visible to the viewer, in which the Z direction of points in the 3D image is taken into account.

As background, it is noted that a present day SLM has a number of pixels, to be used for producing a holographic image, which is much smaller than a holographic film, which is typically very high resolution and is equivalent to many more pixels.

It is noted that phase only-type SLMs modulate phase of reflected laser light, and do not modulate amplitude, of the reflected light.

It is noted that some amplitude only-type SLMs typically modulate amplitude of transmitted laser light, and do not modulate phase of the transmitted light.

An ideal hologram for modulating light to produce a holographic image can modulate both amplitude and phase.

Example embodiments of the invention can optionally be implemented using a SLM for modulating only one of amplitude and phase.

However, example embodiments will usually be described herein with reference to phase-only type SLM for modulating phase. A person skilled in the art will learn from the descriptions herein how to apply embodiments of the invention to other types of SLMs.

In some embodiments, when producing a holographic image of a 3D object by projecting coherent light from a SLM, it is sometimes advantageous not to take into account points on the 3D object which are not visible to, or hidden from, an intended viewer when calculating values for pixels of the SLM. By ignoring the hidden points the computation time and/or effort may potentially be reduced.

In some embodiments, when producing a holographic image of a 3D object, an external skin of the 3D object may be rendered transparent or semi-transparent, and points inside the 3D may be displayed, optionally concurrently with points on the skin. Various depths are optionally viewed by displaying translucent shells of the 3D image.

In some embodiments, producing the CGH includes computing complex amplitude values for SLM pixels as if a 2D surface of the 3D object image is flattened to a planar image in an X-Y plane perpendicular to a direction Z to the viewer. The 2D surface is a 2D curved surface, or shell, in a 3D space. Computing complex amplitude values for a planar image potentially saves computing time and effort which would be used for taking into account values of points on the 2D surface of the 3D object in the Z direction. In some embodiments the X-Y plane is just approximately perpendicular to a direction Z, optionally different from being exactly perpendicular by a small angle, such as 1, 2, 3, 4, 5, 7, 10, 15 degrees.

In some embodiments, after computing values for SLM pixels as if the 2D surface of the 3D object image is flattened, an additional, relatively simple correction to the values of the SLM pixels is performed for the points visible to the viewer, in which the Z direction is taken into account.

In some embodiments the 3D scene is pre-corrected in order to compensate for a distortion caused by a Z-dependent correction to the values computed for the SLM.

In some embodiments, producing the CGH includes computing complex amplitude values for SLM pixels as if the 3D object image is flattened not to one planar image in an X-Y plane perpendicular to a direction Z to the viewer, but to several such planar images, each planar image including points from a slice of the 3D object which lies in a range of Z-coordinate values.

By way of a non-limiting example, two planar images may be produced, a first planar image, or first slice, for points of the 3D object having Z-coordinate values between Zmin and $Z_1$, all flattened to a first Z-coordinate value, and a second planar image, or second slice, for points of the 3D object having Z-coordinate values between $Z_1$ and Zmax. The first Z-coordinate value is typically between Zmin and $Z_1$, inclusive of Zmin and $Z_1$, and the second Z-coordinate value is typically between $Z_1$ and Zmax, inclusive of $Z_1$ and Zmax.

A thickness of a slice, which may be termed $\Delta Z$, determines a resolution in a Z direction of a 3D holographic image produced by embodiments described herein.

It is noted that an tradeoff exists between a number of slices used for producing a 3D holographic image and the resolution in the Z direction, as well as an amount of storage memory required to store a description of a 3D holographic image of a 3D object as slices of the 3D object, and/or bandwidth required to transmit the description of the 3D holographic image of the 3D object.

In some embodiments, after computing complex amplitude values for SLM pixels as if the 3D object image is one or more 2D slices of the 3D object at a specific representative depth (a value along a Z-coordinate), the produced complex amplitude 2D image(s) are decomposed to the various slices composing the 3D image, and an additional, analytical correction to the complex amplitude values is performed, in which a correction for each point in the 2D image is performed based on a actual Z-coordinate value for its slice.

In some embodiments, the above-mentioned produced complex amplitude 2D image is stored and/or transmitted as a more compact representation of a 3D image of 3D scene. Optionally, meta data in a form of depth data for specific areas of the flattened, complex amplitude 2D image is also stored or transmitted.

In some embodiments, the flattened, complex amplitude 2D image is calculated at one location, and applying the corrections is performed elsewhere.

In some embodiments, sending full 3D datasets of 3D scenes is optionally replaced by sending flattened, complex amplitude 2D images as described above, and also sending metadata for applying corrections to reconstruct a 3D scene. Such replacement potentially saves bandwidth in the sending.

In some embodiments, the slices are not of equal thickness. Optionally, slices which portray areas with more relevant details are sliced thinner than slices which portray less relevant details.

In some embodiments a density of points (number of points per unit area) in a slice or in a region within a slice may be different, in the input 3D scene, than in another slice or region. In some embodiments, a thickness of a slice may be determined according to a number of points in the slice, or according to a density of points in the slice.

As mentioned above, an example embodiment will now be described in terms of using a phase-only SLM to produce a 3D Fourier CGH image.

In the example embodiment, since the SLM controls values of phase only and does not control the amplitude, an iterative method is optionally used to determine phase values for the SLM which produce, at a resultant 3D image, a desired amplitude distribution associated with the desired 3D image.

A short qualitative description of an example iterative method for producing a desired amplitude distribution associated with the desired 3D image is now provided based on the Gerchberg-Saxton iterative method.

An initial image is provided, composed of optionally random phase and a desired amplitude for each point in 3D space. In some embodiments the initial image is a three dimensional array of amplitude values, or a three dimensional array of complex (amplitude and phase) values.

The 3D image is flattened to have a single Z-coordinate, resulting in a 2D amplitude image having a desired amplitude for each point in the 2D image plane. In some embodiments the single Z-coordinate is an average Z. A random phase is added to the desired 2D amplitude image as an initial input for the method. In each iteration, an inverse-Fourier transform of the 2D image is produced, producing a Fourier-transformed 2D image. An amplitude of the inverse-Fourier transformed image is removed, and a Fourier transform is performed on a phase-only inverse-Fourier transformed image to produce a first calculated complex amplitude image. In a next iteration the amplitude of the first calculated phase and amplitude (complex value) image is replaced by the initial amplitude, and the phase is left as calculated, and an inverse Fourier transform is calculated.

Next, as done in the first iteration, the amplitude is removed and a Fourier transform is again performed on the phase-only image to get a second calculation of the complex amplitude image.

The above process continues until an end condition is reached. In some embodiments the end condition is a specific number of iterations, in some embodiments the end conditions determining that the process converges to a specific amplitude image—optionally the difference in amplitude between subsequent images is smaller than a specific limit. The phase value of the inverse Fourier transform is an output of the iterative process. In some embodiments an additional correction to the phase is made in some or in all of the iterations in order to speed convergence time. In some embodiments, the correction is as described, termed an input-output iterative method, in J. R. Fienup, see above-mentioned J. R. Fienup, "Reconstruction of an object from the modulus of its Fourier transform".

It is noted that typically, the amplitude of the converged image is approximately the desired, initial amplitude, but the phase is different.

In some embodiments, methods such as the Kinoform and the Gerchberg-Saxton iterative algorithms are contemplated for producing phase-only SLM values for a CGH, by way of a non-limiting example as described in above-mentioned R. W. Gerchberg and W. O. Saxton, "A practical algorithm for the determination of phase from image and diffraction plane pictures", Optik (Stuttgart) 35,237-246 (1972).

Conventional calculation for producing a 3D image includes slicing the 3D image into many 2D slices, and calculating a complex amplitude separately for each one of the 2D slices. The 3D image is then produced by superposition of the complex amplitudes of the slices. The SLM values are the phase values of the total complex amplitude, modulus $2\pi$. However, the above method introduces speckling, and image quality is significantly reduced relative to a true CGH image, because an optimization doesn't take into account other slices Furthermore, iterating for each one of the 2D slices is relatively time consuming. Practical limitations of real time CGH calculation include time and computational capacity, which may set a limit on the number of slices and/or on the number of iterations.

In some embodiments, as described above, iterations are performed for a small number of Z-values, possibly only one Z-value, and the complex amplitudes for slices are subsequently produced by performing a relatively simple, analytical non-iterative correction to the complex amplitude of each slice.

Reference is now made to FIG. 1A, which is a simplified block diagram illustration of a system 101 for producing a Computer Generated Hologram (CGH) according to an example embodiment of the invention.

FIG. 1A illustrates the system 101 and a process of producing a CGH image 114 by reflected light 112 from a SLM 104. Coherent light 110 is projected onto the SLM 104, and the reflected light 112 produces the CGH image 114.

A CGH computing unit 102 optionally transmits data 103 including values for pixels of the SLM, so as to produce the CGH image 114 by the reflected light 112.

The CGH computing unit 102 optionally receives data describing a 3D scene which it is desired to display as a 3D CGH image.

Figure 1B:
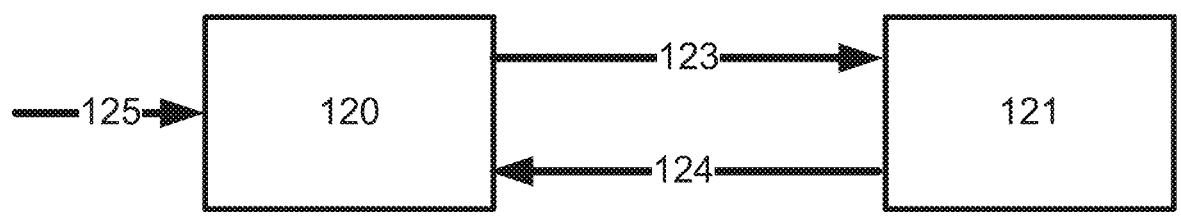
FIG. 1B is a simplified block diagram illustration of a system for producing a Computer Generated Hologram (CGH) according to an example embodiment of the invention.

Reference is now made to FIG. 1B, which is a simplified block diagram illustration of a system for producing a Computer Generated Hologram (CGH) according to an example embodiment of the invention.

FIG. 1B depicts an example embodiment which performs calculations for producing a Computer Generated Hologram in one non-limiting example of distributing the calculations.

FIG. 1B depicts a first computing unit 120 in communication with a second computing unit 121.

In some embodiments, the first computing unit 120 receives data 125 describing a 3D scene, from some data source (not shown). The first computing unit 120 calculates a hologram for producing the 3D scene as a 2D image, optionally producing an array of complex amplitude value for the hologram. The 2D image is produced as viewed from a specific direction. The specific direction may be obtained from the same data source as mentioned above, or by receiving via communication 124 from the second computing unit.

In some embodiments that first computing unit 120 transmits 123 a 2D image to the second computing unit 121, as an array of values for a hologram for producing the 2D image.

In some embodiments the first computing unit 120 optionally calculates a depth map, also termed a Z-map, of the 3D scene, relative to the specific direction. In some embodiments the first computing unit 120 optionally transmits 123 the Z-map to the second computing unit 121.

In some embodiments, the second computing unit 121 uses the received hologram for producing a holographic image of the 3D scene. Optionally, the second computing unit 121 uses the received Z-map to perform correction for depth in the hologram for producing an image of the 3D scene, in some or all of the 3D scene.

In some embodiments, the second computing unit 121 may be included in an end unit or a display unit, which may include one or more Spatial Light Modulators (SLMs), and/or one or more coherent light sources such as lasers, which may optionally be used to display the image of the 3D scene using the above-mentioned depth-corrected hologram.

In some embodiments, the second computing unit 121 decompose slices of different depth of the received hologram of the 2D image; performs Inverse Fourier Transform on the slices; optionally adds depth-dependent quadratic phase changes to at least some of the slices; sums resulting complex amplitude arrays; and optionally sends the array of phase values, modulus $2\pi$, to a SLM.

In some embodiments, the second computing unit 121 may be included in an end unit which may include one or more sensors for sensing a viewer direction and transmitting the viewer direction to the first computing unit 120.

In some embodiments, the second computing unit 121 may receive input such as user-interface input, display environment parameters, or an image of the environment, and transmit 124 data about such input or parameters to the first computing unit 120.

In some embodiments the first computing unit 120 may receive user commands, optionally from a viewer of the 3D scene, and/or additional data pertaining to a viewing environment and/or parameters regarding display of the 3D scene, such as, by way of some non-limiting examples, brightness, magnification, user interface manipulations of the 3D scene. An additional example may be a real object placed inside the image space which may be detected by a user unit 121 and data or images of the object sent to the first computing unit 120. A calculated CGH may optionally be cropped or modified according to the location of the object. In some embodiments, the user commands and/or additional data is received 124 from the second computing unit 121.

Figure 1C:
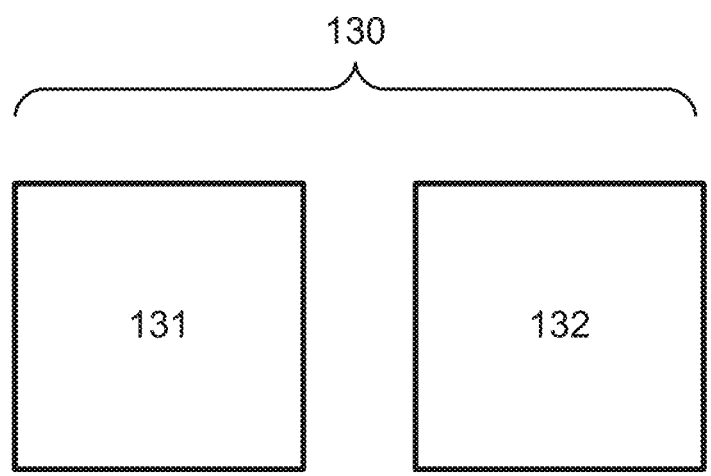
FIG. 1C is a simplified block diagram illustration of a data structure for producing a 3 dimensional (3D) holographic image of a 3D scene according to an example embodiment of the invention.

Reference is now made to FIG. 1C, which is a simplified block diagram illustration of a data structure 130 for producing a 3 dimensional (3D) holographic image of a 3D scene according to an example embodiment of the invention.

The example embodiment of the data structure 130 depicted in FIG. 1B includes:

A first array 131 of values for a Computer Generated Hologram (CGH) for producing a 2D image of a 3D scene as viewed from a specific viewing direction, the 2D image perpendicular to the viewing direction; and a second array 132 of values for a Z-map describing depths of points of the 3D scene relative to the viewing direction.

The first array 131 typically includes values useful for a CGH.

In some embodiments the first array 131 may optionally include complex values, including amplitude and phase.

Figure 2A:
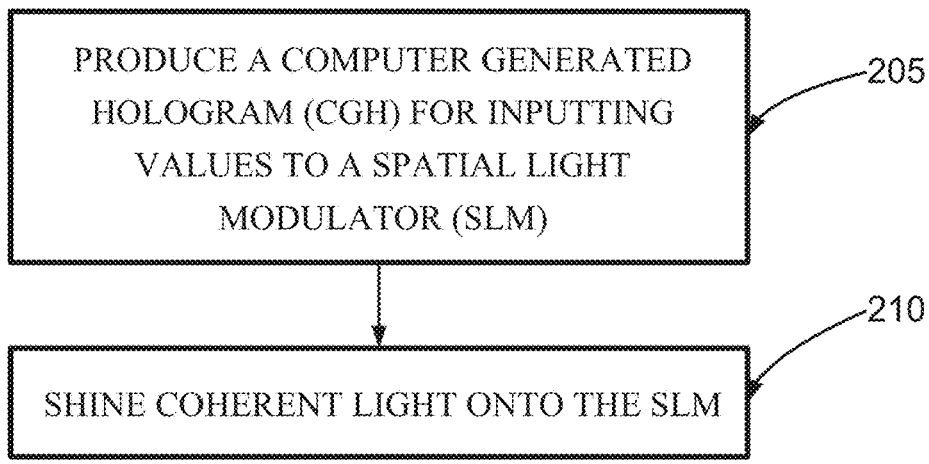
FIG. 2A is a simplified flow diagram illustration of a method of producing a 3 dimensional (3D) holographic image according to an example embodiment of the invention.

Reference is now made to FIG. 2A, which is a simplified flow diagram illustration of a method of producing a 3 dimensional (3D) holographic image according to an example embodiment of the invention.

The method of FIG. 2A includes:
producing a Computer Generated Hologram (CGH) for inputting values to a Spatial Light Modulator (SLM) (205); and
shining coherent light onto the SLM (210).

Figure 2B:
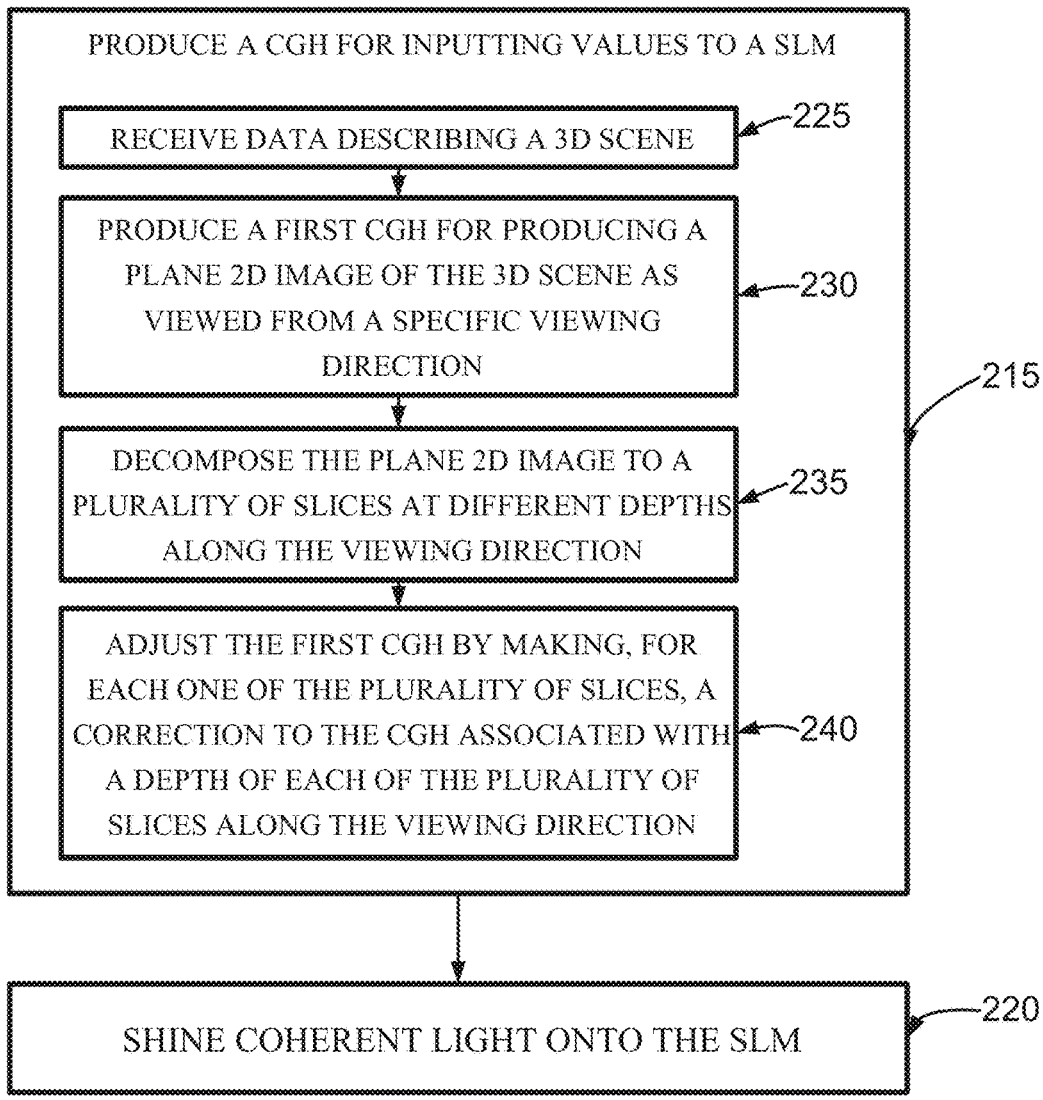
FIG. 2B is a more detailed flow diagram illustration of a method of producing a 3 dimensional (3D) holographic image according to an example embodiment of the invention.

Reference is now made to FIG. 2B, which is a more detailed flow diagram illustration of a method of producing a 3 dimensional (3D) holographic image according to an example embodiment of the invention.

The method of FIG. 2B includes:
producing a Computer Generated Hologram (CGH) for inputting values to a Spatial Light Modulator (SLM) (215); and
shining coherent light onto the SLM (220);
wherein
the producing a CGH comprises:
optionally receiving data describing a 3D scene (225);
producing a first CGH for producing a plane 2D image of the 3D scene as viewed from a specific viewing direction (230). In some embodiment the plane of the plane 2D image is perpendicular to an intended viewing direction;
decomposing the plane 2D image to a plurality of slices at different depths along the viewing direction (235);
adjusting the first CGH by making, for each one of the plurality of slices, a correction to the CGH associated with a depth of each of the plurality of slices along the viewing direction (240), thereby producing a corrected CGH for producing a 3D holographic image of the 3D scene.

Figure 2C:
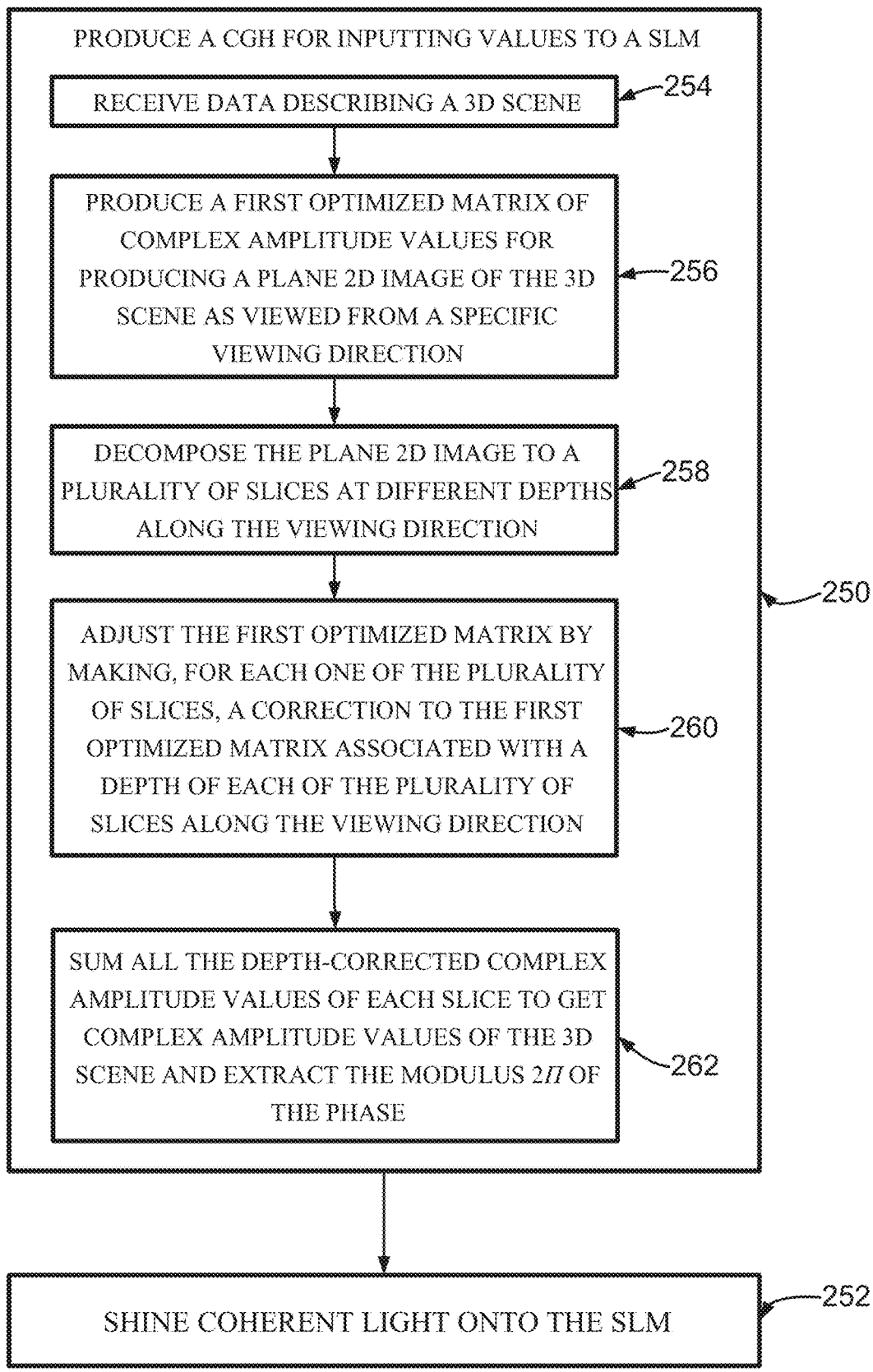
FIG. 2C is a more detailed flow diagram illustration of a method of producing a 3D holographic image according to an example embodiment of the invention.

Reference is now made to FIG. 2C, which is a more detailed flow diagram illustration of a method of producing a 3D holographic image according to an example embodiment of the invention.

The method of FIG. 2C includes:
producing a Computer Generated Hologram (CGH) for inputting values to a Spatial Light Modulator (SLM) (250); and
shining coherent light onto the SLM (252);
wherein
the producing a CGH comprises:
optionally receiving data describing a 3D scene (254);
producing a first optimized matrix of complex amplitude values for producing a plane 2D image of the 3D scene as viewed from a specific viewing direction (256). In some embodiment the plane of the plane 2D image is perpendicular to an intended viewing direction;
decomposing the plane 2D complex amplitude to a plurality of slices at different depths along the viewing direction (258);
adjusting the first optimized matrix by making, for each one of the plurality of slices, a correction to the complex amplitude associated with a depth of each of the plurality of slices along the viewing direction (260), thereby producing a corrected matrix for producing a 3D holographic image of the 3D scene;
summing all the depth-corrected complex amplitudes values of each slice to get complex amplitude values of the 3D scene and extract the modulus $2\pi$ of the phase (262).

Figure 2D:
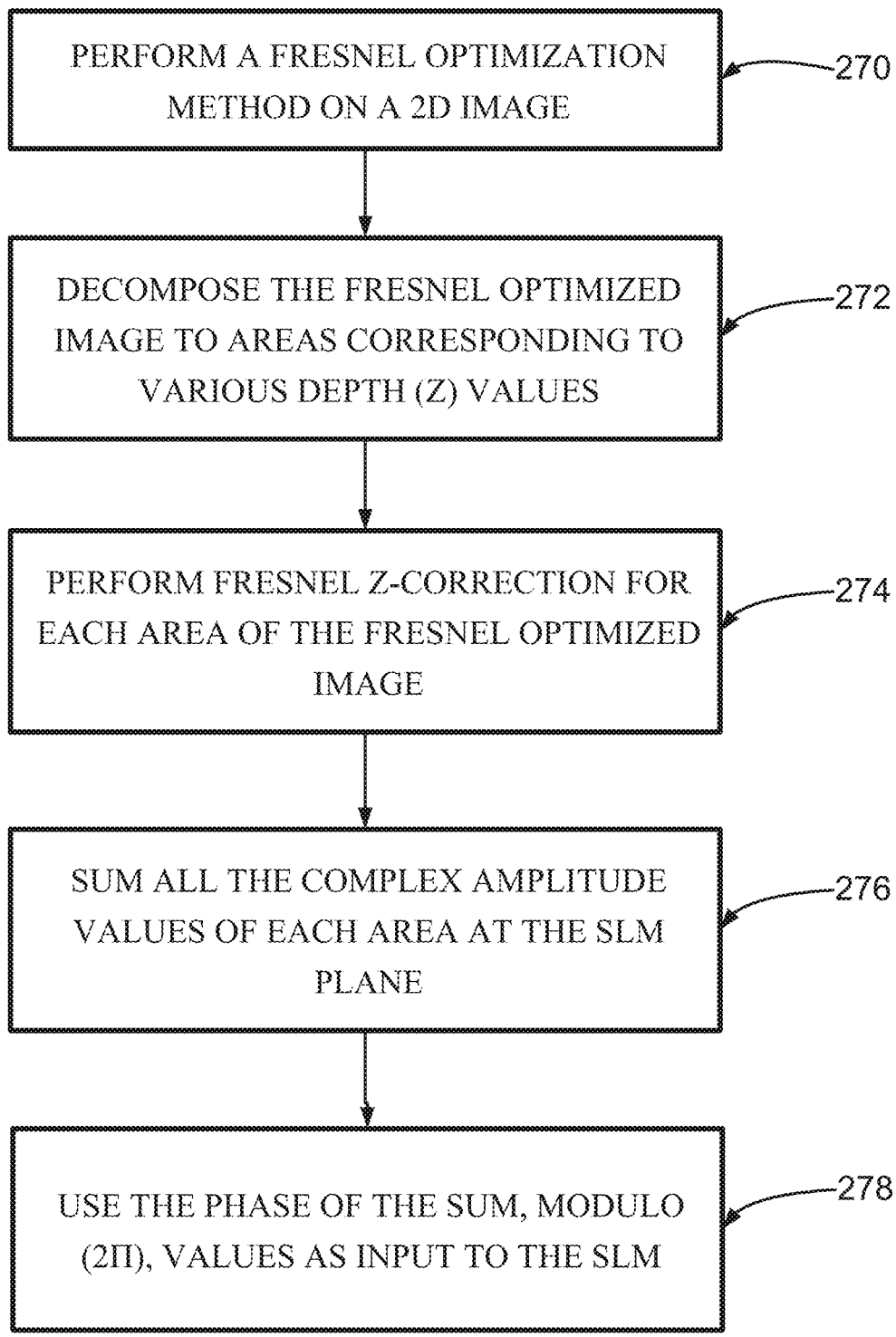
FIG. 2D is a flow diagram illustration of a method of producing a computer generated Fresnel hologram according to an example embodiment of the invention.

Reference is now made to FIG. 2D, which is a flow diagram illustration of a method of producing a computer generated Fresnel hologram according to an example embodiment of the invention.

The method of FIG. 2D includes:
performing a Fresnel optimization method on a 2D image (270), producing a Fresnel optimized image. In some embodiments the Fresnel optimization method may be similar to methods described in above-mentioned article titled: "Design and Fabrication of Computer Generated Holograms for Fresnel Domain Lithography" for Fresnel methods based on Gerchberg-Saxton produced as complex amplitude of a 2D image at an image plane;
decomposing the Fresnel optimized image to areas corresponding to various depth (Z) values (272);
performing Fresnel Z-correction for each area of the Fresnel optimized image (274). In some embodiments the Fresnel Z-correction includes convolution between each area and a kernel-h(dZ) as follows:

$$U_n(x,y,0)=U(x,y,Z_n)\otimes h(x,y,Z_n)$$

where, $$h(x, y, z_n) = \frac{e^{ikz_n}}{i\lambda z_n}e^{i\frac{k}{2z_n}(x^2+y^2)}, \text{ and } z_n = -(Z + \Delta Z),$$

is a distance of an area slice from the SLM. See the above-mentioned "Introduction to Fourier optics", page 67. The above Z-correction propagates each area at a different depth back to the SLM. It is noted that optionally, instead of the convolution, the following approximation may be used for paraxial beam propagation—for each area:

$$U_n(x,y,z_n)=FT^{-1}\{e^{ikz_n}\cdot FT\{U_n(x,y,z)\}\};$$

summing all the complex amplitude values of each area at the SLM plane (276):

$$U(x,y,0)=\Sigma_n U_n(x,y,0);$$

using the phase of the sum U(x, y, 0), Modulo($2\pi$), values as input to the SLM (278). Calculating the phase may be done as follows:

$$\text{Phase}\{U(x, y)\} = \frac{U(x, y)}{|U(x, y)|}$$

Figure 3A:
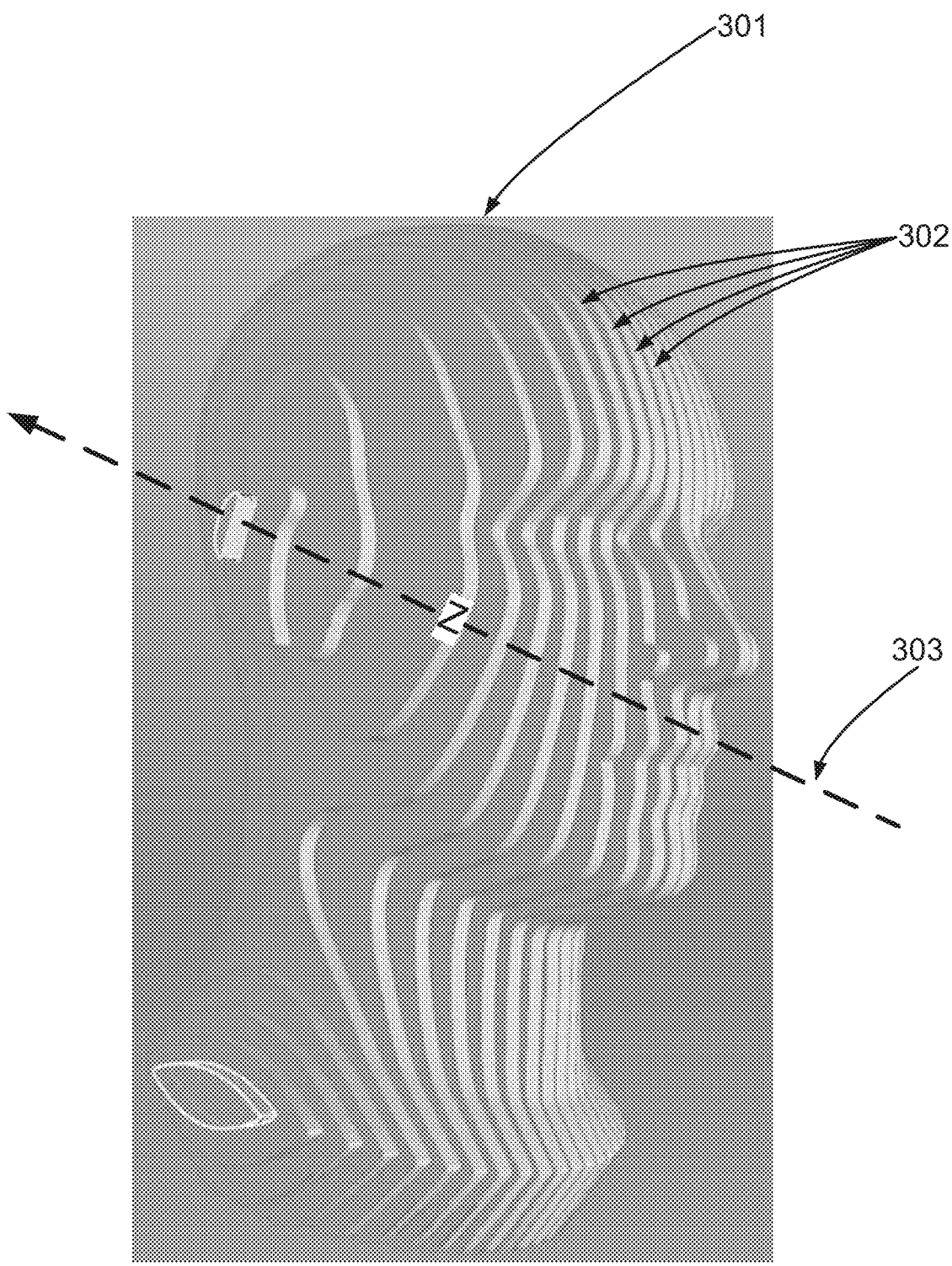
FIG. 3A is a simplified isometric illustration of a 3D scene sliced along a depth axis of the 3D scene in a direction of an intended viewer according to an example embodiment of the invention.

Reference is now made to FIG. 3A, which is a simplified isometric illustration of a 3D scene 301 sliced along a depth axis 303 of the 3D scene 301 in a direction of an intended viewer according to an example embodiment of the invention.

FIG. 3A depicts slices 302 and a depth axis 303 along which the slices are sliced at parallel planes.

It is noted that the depth axis 303 in FIG. 3A is in a direction from which a viewer is viewing the 3D scene. FIG. 3A is intended to depict the thickness of the slices isometrically.

Figure 3D:
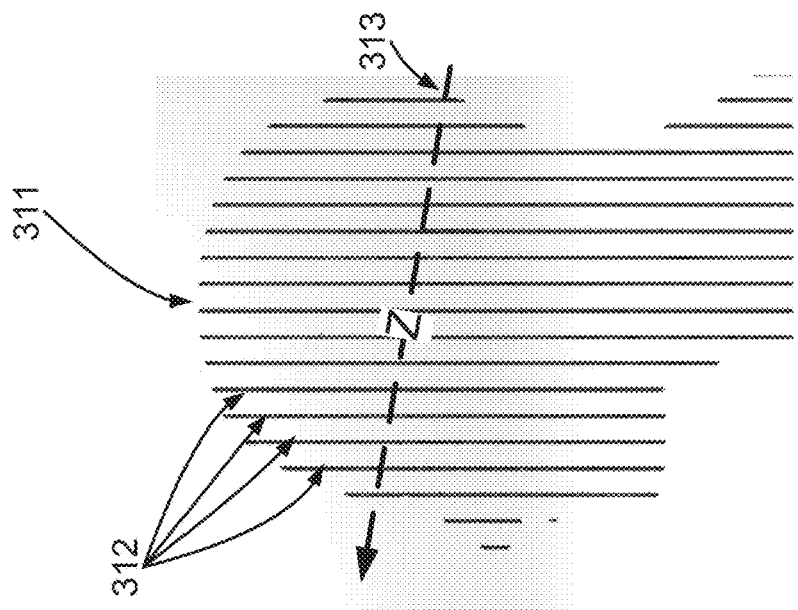
FIGS. 3B, 3C and 3D are simplified isometric, front and side view illustrations of a 3D scene sliced along a depth axis of the 3D scene in a direction of an intended viewer according to an example embodiment of the invention.
Figure 3C:
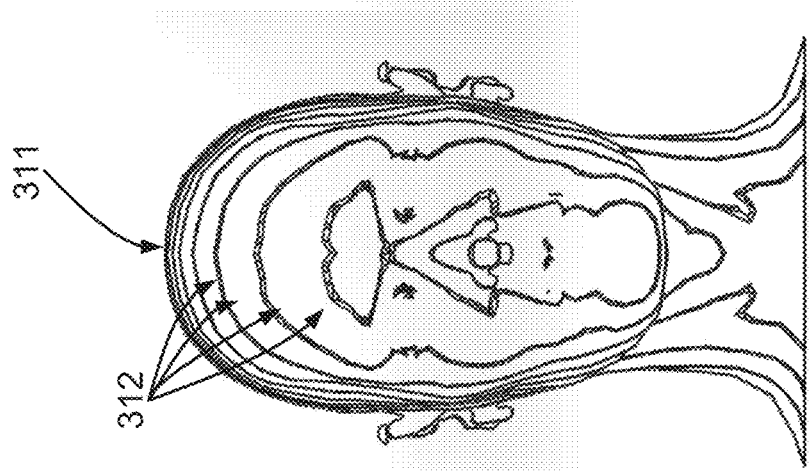
Figure 3B:
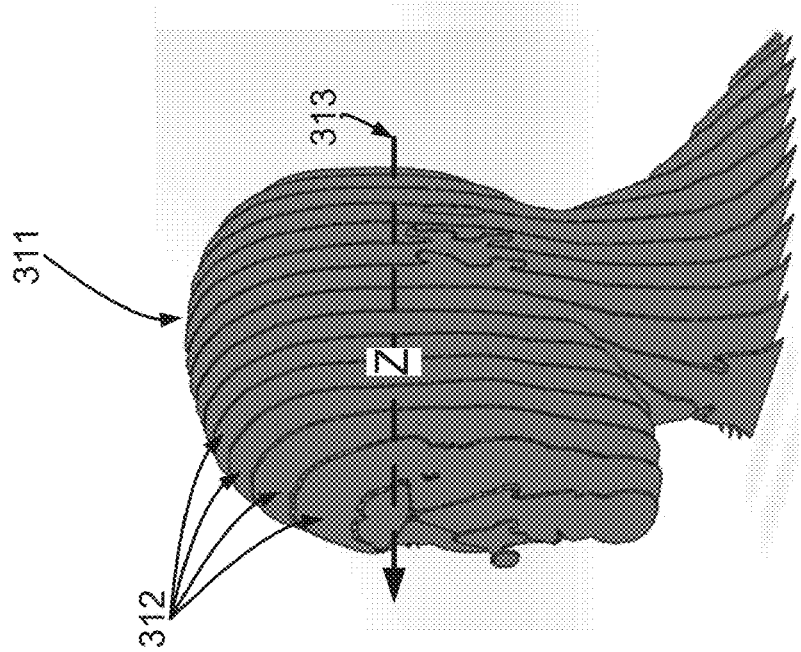

Reference is now made to FIGS. 3B, 3C and 3D, which are simplified isometric, front and side view illustrations of a 3D scene sliced along a depth axis of the 3D scene in a direction of an intended viewer according to an example embodiment of the invention.

FIGS. 3B, 3C and 3D depict the 3D scene, a head 311, sliced along a depth axis 313 of the head 311 in a direction of an intended viewer (not shown) FIGS. 3B, 3C and 3D depicts some of the slices 312.

FIG. 3B is an isometric view, similar to FIG. 3A.

FIG. 3C is a front view which depicts that viewable regions of a slice 312, which are optionally used in computing a depth correction to account for a depth of the slice 312 along the depth axis 313, are not necessarily equal in area.

Description is made herein of performing depth-related changes/corrections to a hologram of a 2D image represent a 3D scene. It is noted that the depth-related changes may be made only to "regions of interest" in an image, however "regions of interest" may be defined. Some non-limiting examples of "regions of interest" include: slices closer to a viewer, e.g. the nose of the head 311; a portion of a slice, or portions of several slices, which contain an object of interest, e.g. a region of the eyes of head 311; slices which include a relatively large area; slices which are part of a feature steeply sloping, thus including a large change in depth, and so on.

FIG. 3D is a side view which depicts equally spaced slices 312. It is not that depth slices 312 do not necessarily have to be equally spaced.

Figure 4:
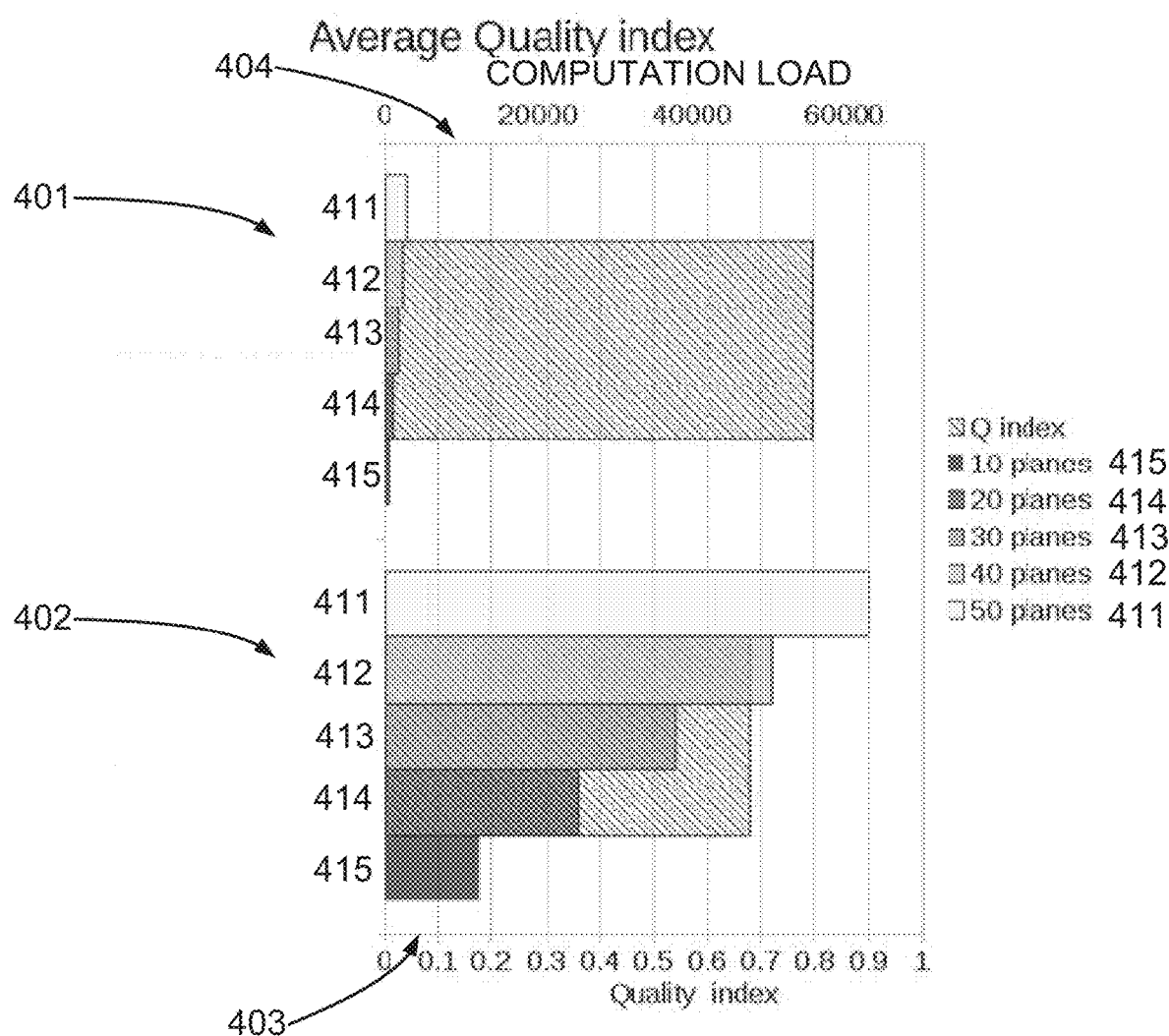
FIG. 4 depicts two graphs illustrating a quality index and a computational load for producing CGH images with different numbers of slices along the depth axis, the CGH images produced according to an example embodiment of the invention.

Reference is now made to FIG. 4, which depicts two graphs 401 402 illustrating a quality index and a computational load for producing CGH images with different numbers of slices along the depth axis, the CGH images produced according to an example embodiment of the invention.

The two graphs 401 402 depict performance charts showing an image quality (Q index) and a computation load for a number of individual Z planes, or slices, in the images.

The two graphs 401 402 depict the relative image quality of 3D CGH images produced using 10 slices (planes) 411, 20 slices (planes) 412, 30 slices (planes) 413, 40 slices (planes) 414, and 50 slices (planes) 415, compared to a Q index. The Q index is further explained below in a section titled "Image quality".

The first graph 401 depicts a quality of images produced by CGHs using the above-mentioned number of planes, each produced using 10 iterations as described above with reference to iterative calculation of a CGH.

The first graph 402 depicts a quality of images produced by CGHs using the above-mentioned number of planes, each produced using 10 iterations as described above with reference to iterative calculation of a CGH, and with the CGHs further corrected as described herein, by way of a non-limiting example as described with reference to FIG. 2B.

The two graphs 401 402 depict a lower X-axis 403 of a relative quality index, and an upper X-axis of a computational load, corresponding generally to a number of Fast Fourier Transforms (FFTs) performed in order to produce the images.

Figure 5:
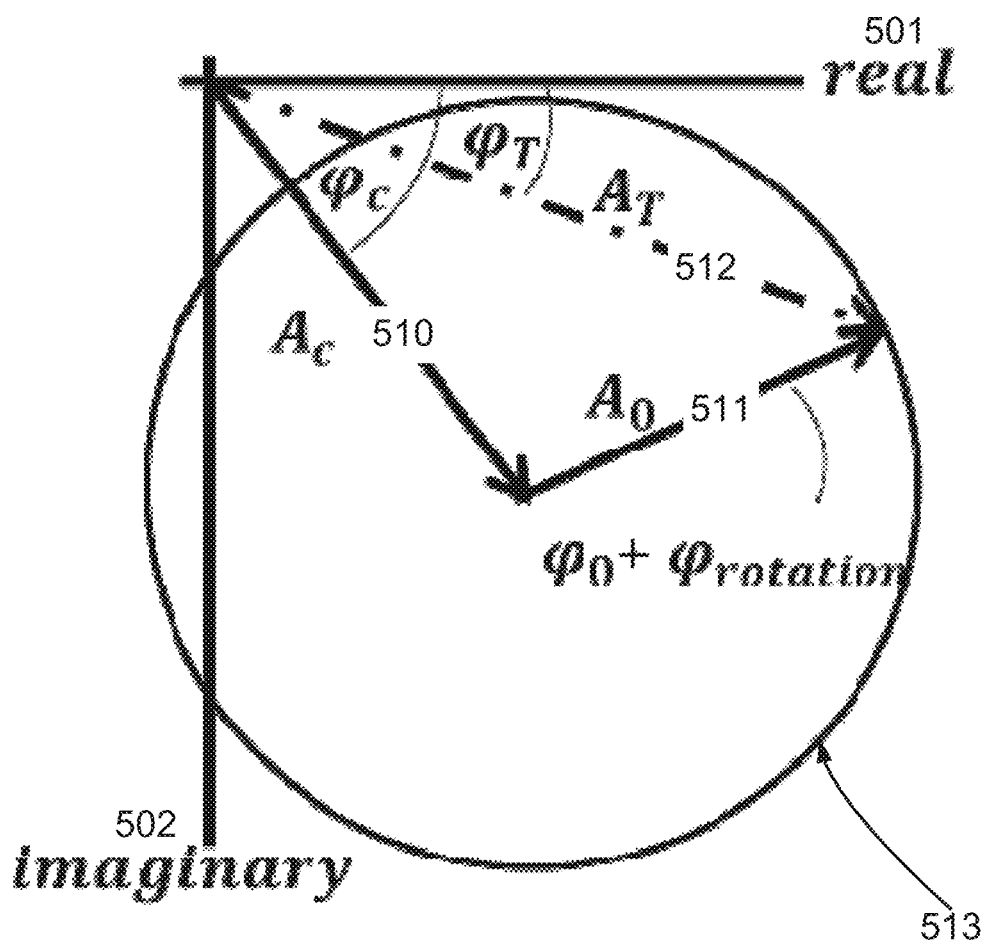
FIG. 5 is a simplified illustration of a complex amplitude of identical 3D images with a single slice at different depths.

Reference is now made to FIG. 5, which is a simplified illustration of a complex amplitude of identical 3D images with a single slice at different depths.

FIG. 5 shows that when a slice of an image is translated along a direction of an axis in a direction of an intended viewer, a result is a circle in the complex plane.

A unified optimization method presented herein as an example embodiment of the invention potentially provides improvements relative to a per-plane optimization method used to date. The improvements potentially include hologram quality, as depicted by the graphs 401 402 of FIG. 4 and by FIG. 8 (described below), and improved performance by lowering computational load.

FIG. 5 is a graphic representation for a solution of the example embodiment global optimization method for all identical images of a single slice at varying depths Z. The solution is a circle 513 in the complex plane. An Imaginary value (Y axis 502) in the figure corresponds to values provided for SLM pixels.

By way of a non-limiting example, taking 3 identical images with different z0 values, generates 3 points that define a unique circle. Furthermore, a ratio between a change in $\varphi_T$ (the method output, which is the SLM input) and a change in z0 ($\varphi_{rotation}$) is optionally discovered geometrically. A method for global optimization as described herein, where iterations are Z independent, produces specific relations between $\varphi_T$ (output) and z0 (input), and may be detected based on the relations.

A geometric relation between $\delta\varphi_T$ and $\delta\varphi_{rotation}$ is:

$$\frac{A_c}{\sin(\varphi_{r.c} + \varphi_{rotation} - \varphi_{T.c} - \varphi_T)} = \frac{A_0}{\sin(\varphi_{T.c} + \varphi_T)}$$

$\varphi_{r,c}$, and $\varphi_{T,c}$ are constants

For $\beta=\varphi_{r,c}+\varphi_{rotation}$ and $\alpha=\varphi_{T,c}+\varphi_T$
and the free parameters are $$\frac{A_c}{A_0},$$

$\alpha$ and $\beta$

For 3 Z-shifted planes there is a unique solution to the above relation.

In some embodiments the analytical change in the complex amplitude due to the change Z0 of a single slice is a quadratic phase change, known in the scalar diffraction theory as the Fraunhofer diffraction approximation. In some embodiments the Z0 dependent change corresponds to a Fresnel diffraction approximation.

In some embodiments the Z-dependent quadratic phase change is in a form of $$e^{i\frac{k\Delta\Phi}{2}(x^2+y^2)}$$

where $$\Delta\Phi = \frac{1}{Z_0+\Delta z} - \frac{1}{Z_0}$$

is a Z-dependent change in optical power and $\Delta z$ is a change in depth with respect to a nominal 2D plane at $Z_0$.

In some embodiments the $Z_0$ dependent change corresponds to a known angular spectrum diffraction theory, where the Z-dependent phase change is:

$$e^{ik\left(\sqrt{(Z_0+\Delta z)^2+x^2+y^2} - \sqrt{Z_0^2+x^2+y^2}\right)}.$$

For any of the analytical $Z_0$ dependent changes according to any of the diffraction theories, a corresponding signature of the change in the complex amplitude can be calculated, because the change in the complex amplitude is analytical and not a noise-dependent iterative solution as in conventional methods, a signature of the method can be detected.

In some embodiments, for any of the analytical $Z_0$ dependent changes, according to any of the diffraction models, a pre-distortion correction to the 3D scene may optionally be applied. For example, the quadratic or spherical phase correction induces magnification in the x y directions. Pre de-magnification of the original scene may optionally be used to compensate for such a distortion.

According to some embodiments of the invention the 3D scene is pre-corrected for a distortion associated with the quadratic phase correction.

According to some embodiments of the invention the 3D scene is pre-corrected for a distortion associated with the Fresnel correction.

According to some embodiments of the invention the 3D scene is pre-corrected for a distortion associated with the angular spectrum correction.

Additional Description of an Example Embodiment

Figure 6:
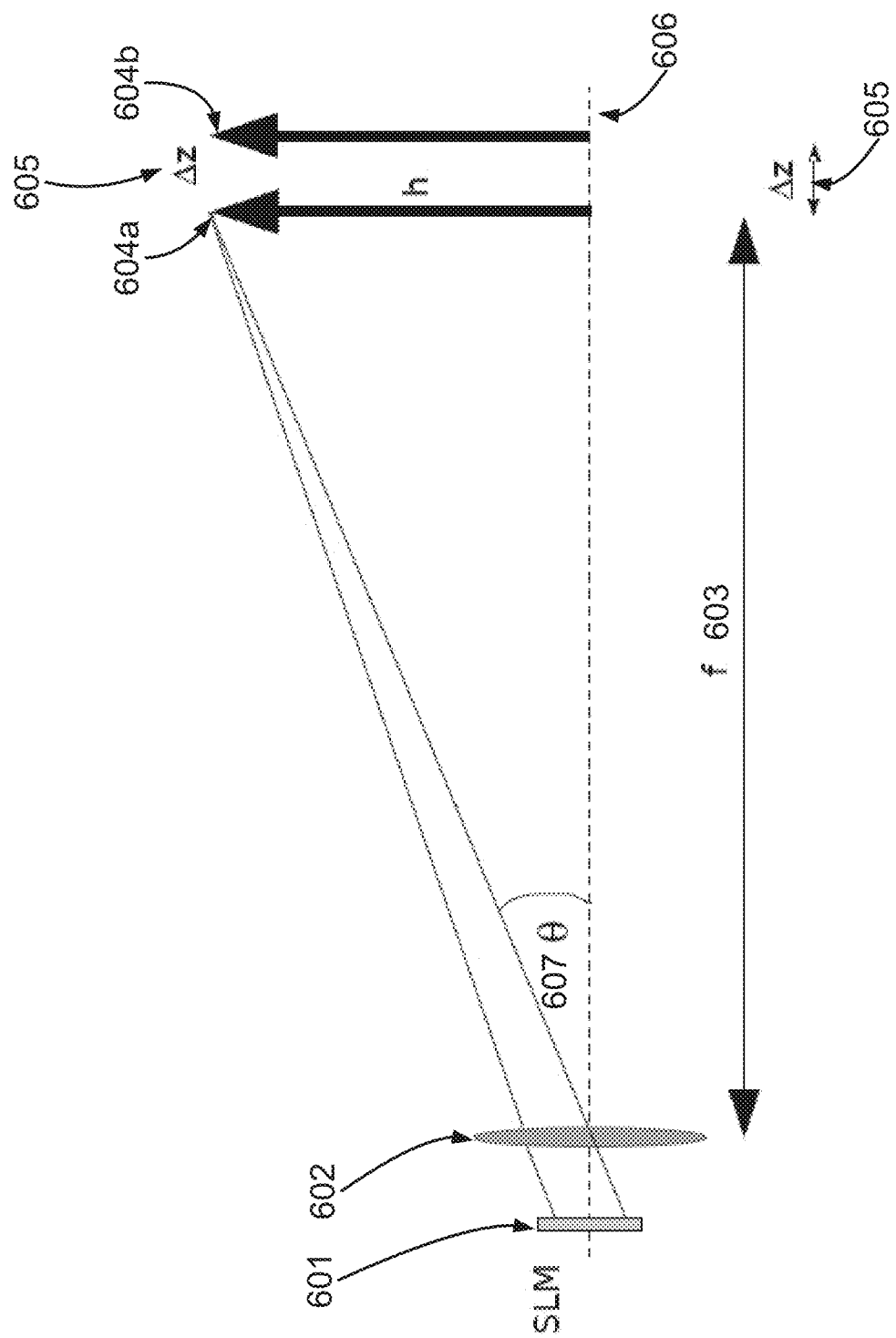
FIG. 6 is a simplified illustration of basic geometry of a SLM producing a CGH images according to an example embodiment of the invention.

Reference is now made to FIG. 6, which is a simplified illustration of basic geometry of a SLM producing a CGH images according to an example embodiment of the invention.

FIG. 6 depicts an optical diagram of a SLM 601, a lens 602 with a focal length f 603, a first image 604a, and a second image 604b shifted by a distance delta-Z 605 along a Z-axis 606.

SLM diffraction angle $\theta$ 607: A maximal diffraction angle $\theta$ 607 of a SLM 601 potentially depends on the SLM 601 pixel pitch (p) and an incident wavelength ($\lambda$) as follows:

$$\sin\theta=\lambda/2p$$

System effective focal length f 603: Given a maximal image 604a height (h), a system effective focal length f 603 is a focal length of an ideal lens 602 required to generate a given maximal height with a maximal diffraction angle:

$$f=h/\tan\theta\approx 2ph/\lambda.$$

Calculation tile: An elemental calculation element in a matrix on which an actual FFT-based optimization is performed. A maximal image resolution is potentially limited by the tile size. A tile size of N×N will result in an image with N×N voxels. A distance in the image between adjacent voxels will then be:

$$\Delta x=\Delta y=2h/N$$

Color scaling: Since a diffraction angle $\theta$ 607 depends on a wavelength of coherent light impacting the SLM 601, a rendered image 604a is optionally scaled accordingly prior to CGH calculation, in order for different colors to optionally overlap. If the scaling is not performed, each color might produce a different hologram size. Given a minimal wavelength of $\lambda_B$, a rendered image is optionally scaled by a factor of:

$$S=\lambda_B/\lambda$$

and then optionally padded with zeros to the tile size.

Residual lens: a virtual lens with a focal length $f_R$ added to a plane in order to focus at a correct plane distance z which is located $\Delta z$ 605 from the system focal plane.

$$f_R=fz/\Delta z$$

Figure 7:
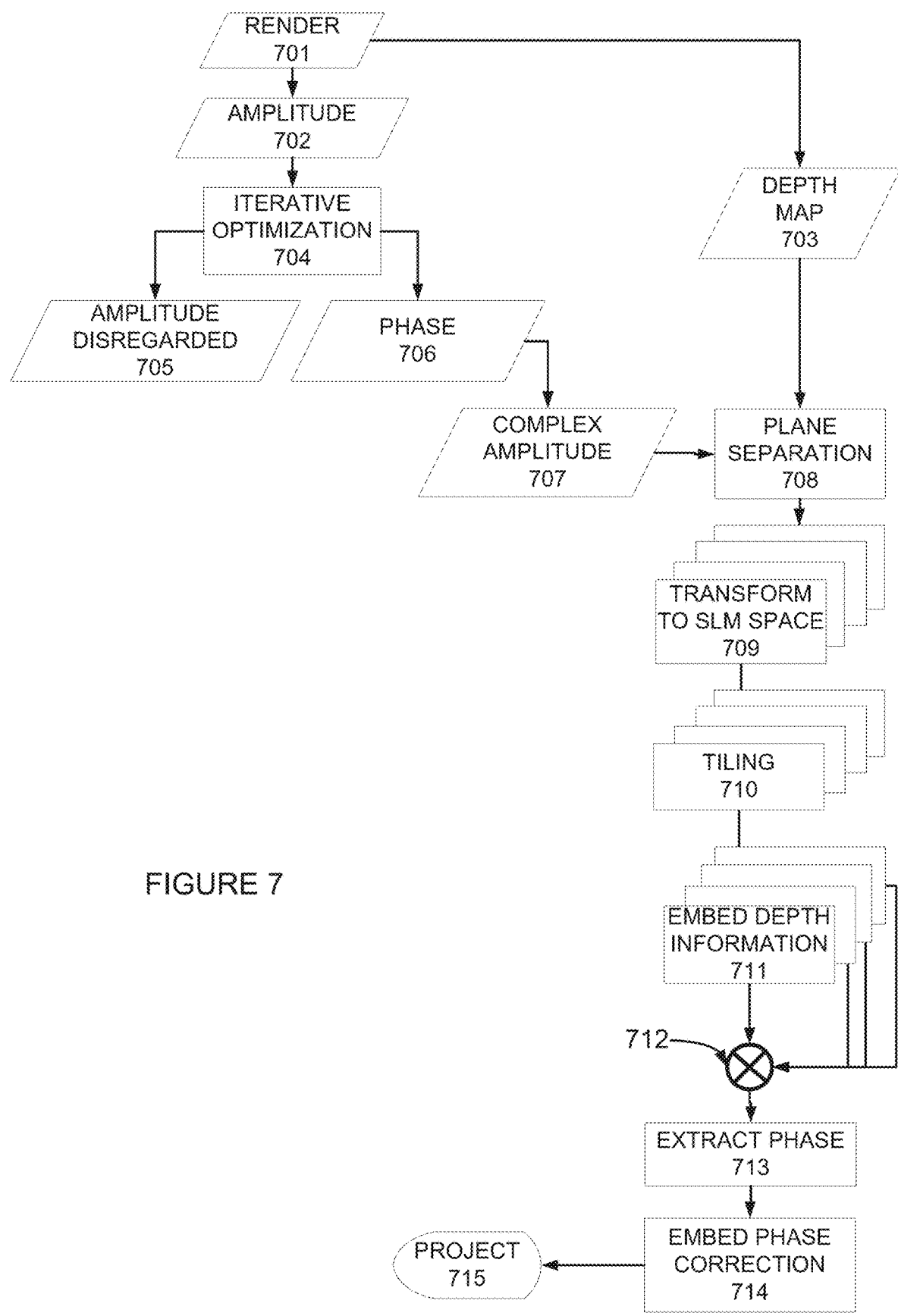
FIG. 7 is a simplified flow diagram illustration of a method of producing a 3 dimensional (3D) holographic image according to another example embodiment of the invention.

Reference is now made to FIG. 7, which is a simplified flow diagram illustration of a method of producing a 3 dimensional (3D) holographic image according to another example embodiment of the invention.

The flow diagram of FIG. 7 describes an example embodiment as follows: Render an image as an input (701). For example:

$$U_{in}=A(x,y)e^{i\Phi_R}$$

Take an amplitude A(x, y) of the rendered image (702), optionally with additional random phase, $\Phi_R$;
Perform iterative optimization (704) which includes:
Perform Fourier transform:
U=FFT [Uin];
Produce (optionally normalized) complex values;
Disregard amplitude of the complex values (705); and keep phase information (706), optionally by computing and array G, where G=U/|U|;
Transform G back to real space: Uout=IFFT[G];
Calculate a convergence boost term, by way of a non-limiting example using above-mentioned Fienup formalism:

$$\Delta G=2A\ Uout/|Uout|-Uout-AUin/|Uin|$$

Optionally add the convergence boost term in one of two ways to get a new input function for an optional next iteration:

Input based correction: Uin=Uin+ΔG;
or
Output based correction: Uin=Uout+ΔG;

Optionally repeat performing from "Fourier transform" to "add the boost term" according to a desired number of iterations.

modify the normalized complex amplitude (707), optionally by computing:

$g = A(x,y)U\text{in}/|U\text{in}|;$ to embed a desired amplitude A(x, y) of the rendered image into an array of phase values Uin as described above with reference number 702;

g is a new input for the iterative process.

Optionally continue iterations until the amplitude is approximately the desired amplitude with a phase produced by the iterative calculations.

generate a complex matrix according to a depth map (703), optionally including only values which belong a desired plane (gP), also termed slice (708);

Fourier transform the complex matrix to SLM space (709):

$GP = FFT[gP]$

Tile the result to fill a SLM frame matrix (G'P) (710).

Optionally, super impose a quadratic phase correction (711) according to a slice depth:

$SLMP = G'P \cdot \exp[i\theta]$ where $\theta = \pi \Delta z (x^2 + y^2)/\lambda f z$ optionally $\theta = \dfrac{\pi \Delta \Phi}{\lambda}(x^2 + y^2)$ where $\Delta \Phi = \dfrac{1}{Z_0 + \Delta z} - \dfrac{1}{Z_0}$ sum all planes (712);
extract the phase (713) to produce a complete hologram (715):

SLM=EPSLMP

In some embodiments, additional phase correction may optionally be applied for correction of distortion (714).

Optionally produce the phase matrix 0 to 2π in a representation suitable for DVI or some other example embodiment of a projection protocol.

FIG. 7 depicts an optional process of tiling, between "transform to SLM space" and "embed depth information".

Tiling

Calculating digital holograms is in general a heavy computational task, and it is desirable to reduce the computational load. Computation complexity in FFT based calculations depends on the matrix size and the number of matrices needed to represent the volume to be displayed. Furthermore, FFT is most efficient when operating on square matrices having dimensions which are powers of 2: 64, 128, 256, 512, 1024 etc. It will often be more efficient to calculate a 1024×1024 matrix than to calculate a 600'600 matrix, depending on hardware optimization, among other factors, even though the latter is the size that is actually needed. By way of a non-limiting example, a full HD SLM, 1920×1080 may use for calculation a 2048×2048 matrix per depth.

Tiling is based on a property of a DFT (Discrete Fourier Transform), which is periodic boundary conditions. The DFT is a circular Fourier transform resulting from its finite size, as opposed to a classic Fourier transform which is infinite. Circularity means that connecting the edges of the calculation matrix results in a continuity. The DFT can be viewed as a standing wave resonator, the DFT size determines the lowest frequencies the DFT can support, and the DFT resolution the highest. As a result of circularity, a matrix in the frequency domain can be duplicated and tiled in both dimensions to cover a larger surface without abrupt discontinuities and projection artifacts.

A matrix in the frequency domain can be duplicated and tiled in both dimensions to cover an area larger than the matrix without abrupt discontinuities, and therefore without producing tiling artifacts. Covering a full HD SLM may be achieved by calculating a smaller matrix, say 1024×1024, 512×512 matrix, tiling the smaller matrix to cover an area equal to or larger than the SLM area, and then cropping to the size of the SLM. The cropping produces an effect corresponding to a high pass filter which eliminates only few of the lowest frequencies.

In some embodiments a process of calculating a CGH involves using Fast Fourier Transforms (FFTs) that are best performed for a matrix size of N*M where N and M are powers of 2. The complexity of a FFT for a NXN matrix is N*log(N). Therefore for a typical full HD size SLM (1020×1920 array), one may calculate a FFT at a matrix size of 2048×2048, which is a minimal power of 2 that covers the above-mentioned full HD array. Using the tiling method, when calculating a FFT for a matrix size of 512×512, the computation complexity is reduced by a factor of $\dfrac{2048 * \ln(2048)}{512 * \ln(512)} \sim 5$ relative to calculating the FFT for a matrix size of 2048×2048.

The above description is also relevant for an array with dimensions which are not exactly a power of 2—the complexity of a full HD matrix (1020×1920) is approximately similar to the complexity of an array of size 1024×2048.

Once a small tile is calculated, duplicated tiles may optionally be used to produce a full HD array size (1020×2048). The tiling may require memory and may introduce additional complexity. A tradeoff between tiling and performing FFT for a reduced-size-matrix was analyzed. In some embodiments, for a single FFT manipulation, a ratio of 2 for a ratio between a tile and an original matrix size may be preferable.

When using iterative algorithms, a number of FFT operations used is 2*M, where M is the number of iterations. In such a case the factor 2 of the maximal ratio may not be used. For 10 iterations even a ratio of 20 in tile size may be preferable. In other words, for example for 10 iterations, a difference in complexity between 2048×2048 and 512×512 is nearly 0.2.

In some embodiments, covering a full HD SLM is optionally achieved by calculating a smaller matrix, say 1024×1024, 512×512, rather than 2048×2048, and tiling the smaller matrix to cover a larger area than the SLM, and optionally also cropping to the SLM actual size.

In some embodiments the matrix size is uneven and the tile is uneven. That is 512×1024 or 1024×2048.

Tile size selection: Tile size can determine the amount of information one can represent. A 512×512 tile can represent 512×512 voxels in an image. If the image size is, by way of a non-limiting example, 100×100 mm², a distance between adjacent voxels is 100/512=~0.2 mm. The human visual system typically does not resolve better than 0.2 mm. In some embodiments, a tile larger than 512×512 is not used.

Using tiling potentially provides advantages, such as, by way of some non-limiting examples:

(1) A reduction of computation time. Since CGH calculation according to some embodiments of the invention involves FFT-based optimization, which includes several FFT calculations per optimization, such as used for iterative methods, the time saved by using tiling is multiplied by the number of FFTs needed for optimization.

Since CGH calculation usually involves an optimization process containing multiple FFT calculations, the time saved by using a smaller calculation matrix exceeds the time consumed by a copying process used for tiling. For example: if a time to calculate a FFT for a 1024×1024 matrix is $T_{1024}$ and the time to calculate a FFT for a 2048×2048 matrix is $T_{2048}$, and $T_{2048} > T_{1024}$, then in a case of a 10 iteration optimization where each iteration involves 2 FFT calculations, selecting a 1024×1024 tile will result in reducing calculation time by a factor of ~20.

$$[20*(T_{2048} - T_{1024}) - \text{Tiling\_Copy\_Time} \approx 20*(T_{2048} - T_{1024})]$$

Furthermore, if 512×512 tile calculation is selected, tiling results in additional reduction of calculation time. The tiling approach is potentially more efficient as long as time saved by tiling is larger than a time it takes to duplicate tiles to complete a full frame (data copy time).

(2) Providing a potential degree of freedom in a design of a 3D system.

(3) Using less memory.

Figure 8:
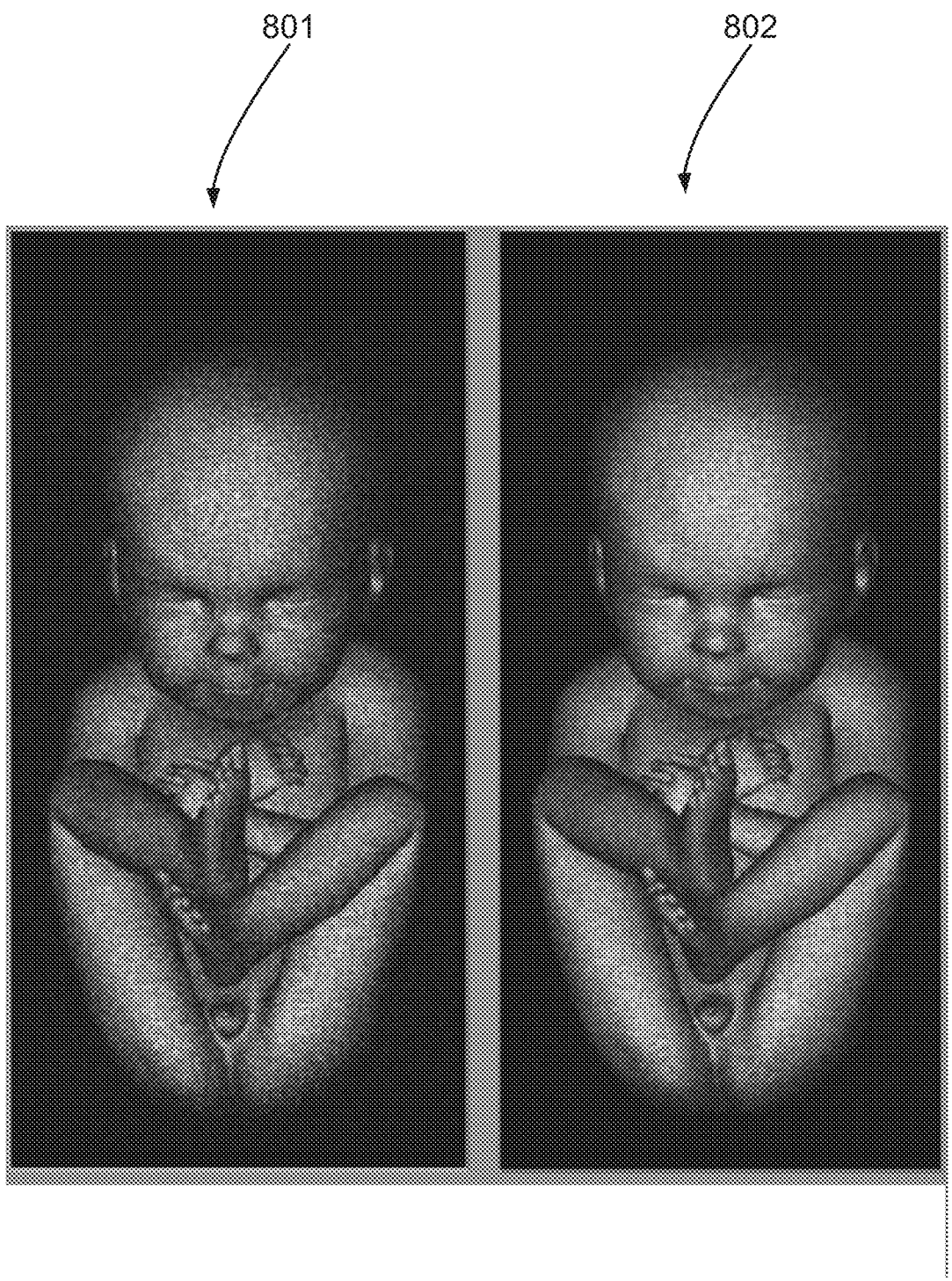
FIG. 8 depicts two pictures of CGH images, comparing a prior art method of producing a CGH image to producing a CGH image according to an example embodiment of the invention.

(4) Can be used to distribute calculation: one of the limiting factors in distributed computation is communication needed to share data and collect computational results. It is more efficient to pass a tile, optionally with meta-data describing depth of the tile in an image volume, time stamp etc. to be tiled and super imposed at an end point. Reference is now made to FIG. 8, which depicts two pictures 801 802 of CGH images, comparing a prior art method of producing a CGH image to producing a CGH image according to an example embodiment of the invention.

The two CGH images were produced from synthetic data.

The first picture 801 is a picture of a CGH image produced by a prior art conventional iterative algorithm where each plane is optimized individually.

The second picture 802 is a picture of a CGH image produced by an example embodiment of a global optimization method according to an embodiment of the invention. The second picture shows reduced speckling in the CGH image, thereby demonstrating an improved image quality.

Figure 9:
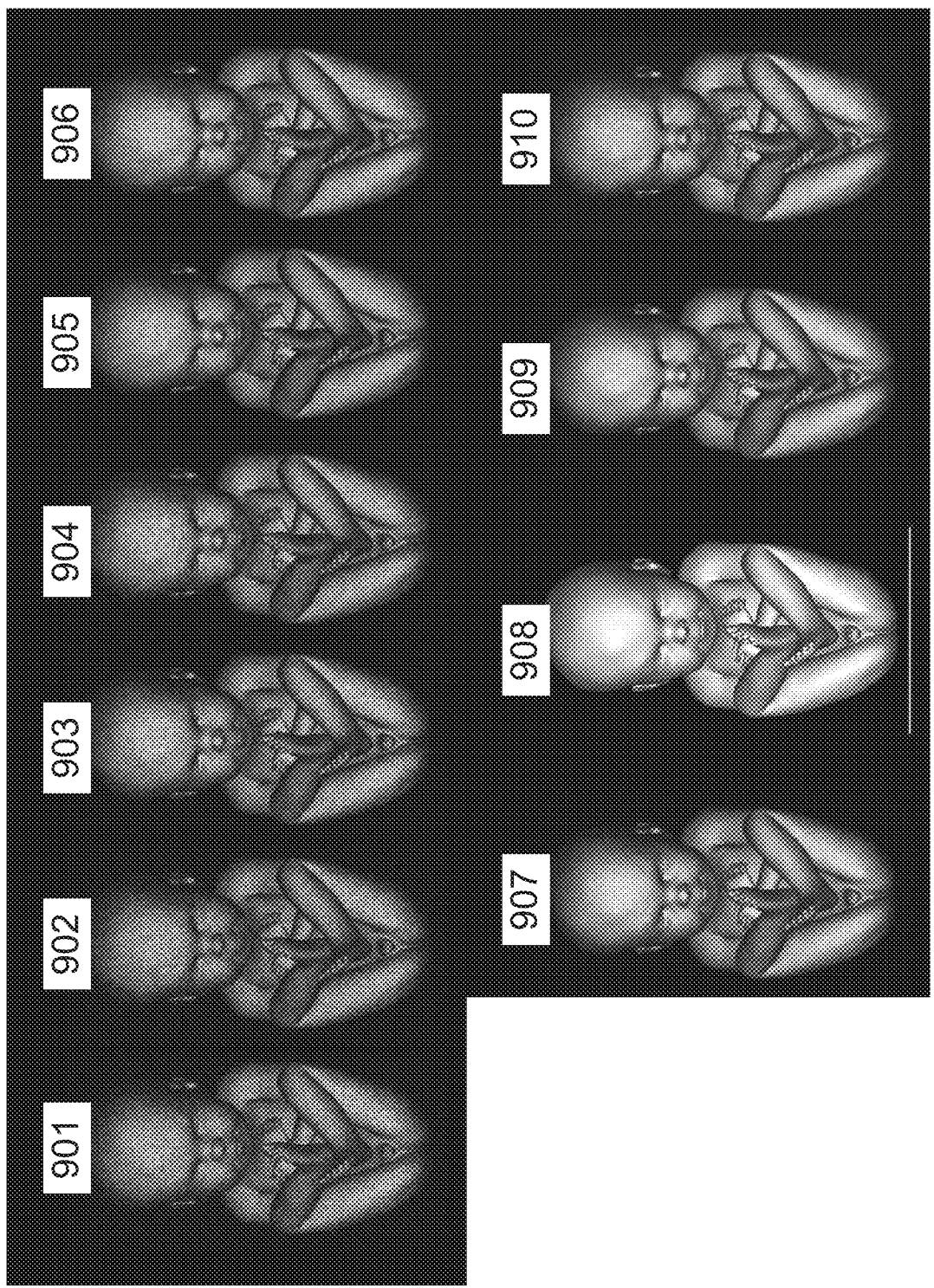
FIG. 9 depicts pictures of CGH images, comparing different methods of producing a CGH image according to different example embodiments of the invention.

Reference is now made to FIG. 9, which depicts pictures of CGH images, comparing different methods of producing a CGH image according to different example embodiments of the invention.

FIG. 9 is intended to show relative quality of 3D images produced by different embodiments of the invention. It may be helpful to view a single part of the pictures, such as the eyes, to compare quality.

The different methods used to produce the CGH images are listed below:

Picture 901: 1 iteration per plane.

Picture 902: 10 iterations per plane.

Picture 903: 1 iteration per plane, output-based correction based on the Gerchberg-Saxton method.

Picture 904: 1 iteration per plane, input-based correction based on the Gerchberg-Saxton method.

Picture 905: 10 iterations per plane, output-based correction.

Picture 906: 10 iteration per plane, input-based correction.

Picture 907: 10 iterations per plane, output-based correction.

Picture 908: A 3D image produced without slicing.

Picture 909: 10 iterations per plane, input-based correction.

Picture 910: 10 iterations per plane.

Simulation Results

Simulation method: SLM frames were calculated using embodiments of the invention in various global optimization and per plane optimization methods. In global optimization both input and output correction were used, as described in above-mentioned J. R. Fienup, "Phase retrieval algorithm: a comparison," Appl. Opt. 21, 2758-2769 (1982).

A Fresnel beam propagation method was used to simulate hologram reconstruction. Two methods were used to analyze image speckle noise: PSNR (Peak Signal to Noise Ratio) and Quality index.

Image Quality

Noise analysis: Two methods for estimating speckles noise were used:

PSNR (Peak Signal to Noise Ratio): This method compares two images I and $I_0$ in the following way:

$$PSNR = 10 \log_{10} (M/MSE)$$

where M=Maximum possible value of the image.

$$MSE = 1/NK \sum_{a=1}^{K} \sum_{b=1}^{N} [(I(a, b) - I_0(a, b))^2]$$

It is noted that a higher PSNR denotes less difference between compared images.

Quality index: This method compares two images I and $I_0$ in the following way:

$$Q = \frac{4\sigma' \langle I \rangle \langle I_0 \rangle}{(\sigma^2 + \sigma_0^2)(\langle I \rangle^2 + \langle I_0 \rangle^2)}$$

Where $$\sigma' = \frac{1}{KN-1} \sum_{a=1}^{K} \sum_{b=1}^{N} [I(a, b) - \langle I \rangle][I_0(a, b) - \langle I_0 \rangle]$$

It is noted that Q can have values between −1 and 1. Q=1 when there is a perfect match between images.

Computational complexity: Since a major difference between computation methods is the amount of FFT operations, FFT per second is used as a measure for comparison.

FIG. 9 shows a comparison of simulation results. The images are in linear scale, and background speckle noise is suppressed. To the eye the speckle noise resulting from the per-plane optimization is significantly larger than speckle noise arising from unified optimization. A quantitative analysis of the simulation results is shown in FIG. 4.

It is expected that during the life of a patent maturing from this application many relevant SLMs will be developed and the scope of the term SLM is intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6.

This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A system for producing a Computer Generated Hologram (CGH), the system comprising:
    a first computing device for preparing data for producing a 3 dimensional (3D) holographic image of a 3D scene, the device comprising a first computing unit arranged for:
        receiving data describing a 3D scene;
        producing one complex amplitude array for a 2D image of the 3D scene as viewed from a specific viewing point; and
        producing a depth-map describing depths of points of the 2D image of the 3D scene relative to the specific viewing point;
    a second computing device; and
    a Spatial Light Modulator (SLM);
    wherein:
    the second computing device is arranged for:
        receiving the one complex amplitude array for the 2D image of the 3D scene and the depth-map;
        decomposing the one complex amplitude array for the 2D image of the 3D scene into slices that correspond to a specific depth according to the depth-map;
        performing an inverse-Fourier transform of the complex-amplitude array slices, producing inverse-Fourier-transformed complex amplitude arrays;
        correcting the inverse-Fourier-transformed complex arrays according to the specific depth of each slice, producing corrected complex amplitude arrays;
        summing all the corrected complex amplitude arrays, producing a second complex amplitude array; and
        producing a corrected optimized complex amplitude array for producing a 3D holographic image of the 3D scene by using only the phase values of the second complex amplitude array.

2. The system of claim 1 wherein the producing one complex amplitude array for a 2D image of the 3D scene as viewed from a specific point comprises producing one complex amplitude array for a 2D image on a spherical shell which is perpendicular to a direction Z to the specific point.

3. The system of claim 1 wherein the producing one complex amplitude array for a 2D image of the 3D scene as viewed from a specific point comprises producing one complex amplitude array for a 2D image on a plane which is perpendicular to a direction Z to the specific point.

4. The system of claim 1 and further comprising the second computing device is arranged for adding a random phase to the complex amplitude 2D array.

5. The system of claim 1 and further comprising the first computing device arranged for sending only the phase values of the one complex amplitude 2D array for producing the 3D holographic image of the 3D scene to the second computing device.

6. The system of claim 1 and further comprising:
   an SLM (Spatial Light Modulator) arranged to receive the corrected optimized complex amplitude array.

7. The system of claim 6 and further comprising a coherent light illuminator arranged for illuminating the SLM with coherent light, thereby producing a 3D holographic image of the 3D scene.

8. The system of claim 1 wherein the first computing device comprises a transmitter arranged for transmitting the one complex amplitude array and the depth-map from the first computing device to the second computing device.

9. The system of claim 8 wherein the first computing device comprises the transmitter arranged for transmitting only the phase values of the one complex amplitude array and the depth-map.

10. The system of claim 1 wherein the first computing device and the second computing device are the same computing device.

11. The system of claim 1 wherein the correcting the inverse-Fourier-transformed complex arrays according to the specific depth of each slice comprises correcting using a quadratic phase correction.

12. The system of claim 11 wherein the correcting using a quadratic phase correction comprises is calculated based on the specific depth divided by a wavelength of light of the SLM, modulo $2n$.

13. The system of claim 1 wherein the correcting the inverse-Fourier-transformed complex arrays according to the specific depth of each slice comprises correcting using a Fresnel depth correction.

14. The system of claim 1 wherein the correcting the inverse-Fourier-transformed complex arrays according to the specific depth of each slice comprises correcting using an angular spectrum correction.

* * * * *